United States Patent
Frydenger

(10) Patent No.: US 10,935,231 B2
(45) Date of Patent: Mar. 2, 2021

(54) SYSTEMS AND METHODS FOR A MIRROR MOUNTED LIGHT WITH MOBILE DEVICE MOUNTING

(71) Applicant: Luke Frydenger, Boulder, CO (US)

(72) Inventor: Luke Frydenger, Boulder, CO (US)

(73) Assignee: AYLO LLC, Boulder, CO (US)

( * ) Notice: Subject to any disclaimer, the term of this patent is extended or adjusted under 35 U.S.C. 154(b) by 135 days.

(21) Appl. No.: 16/160,633

(22) Filed: Oct. 15, 2018

(65) Prior Publication Data

US 2020/0116347 A1 Apr. 16, 2020

(51) Int. Cl.
*F21V 23/00* (2015.01)
*F21V 33/00* (2006.01)
(Continued)

(52) U.S. Cl.
CPC ........ *F21V 33/004* (2013.01); *F21V 21/0808* (2013.01); *F21V 21/092* (2013.01);
(Continued)

(58) Field of Classification Search
CPC ....... F21V 33/004; A45D 40/18; A45D 33/26; A45D 33/008; A45D 33/32; A45D 42/10;
(Continued)

(56) References Cited

U.S. PATENT DOCUMENTS

| | | | |
|---|---|---|---|
| 484,964 A | 10/1892 | Hills | |
| D44,537 S | 8/1913 | McIsaac | |

(Continued)

FOREIGN PATENT DOCUMENTS

| | | |
|---|---|---|
| CA | 147356 S | 4/2013 |
| CN | 302432849 S | 5/2013 |

(Continued)

OTHER PUBLICATIONS

International Search Report and Written Opinion dated Jan. 14, 2020 issued in related PCT App. No. PCT/US19/56391 (14 pages).

(Continued)

*Primary Examiner* — William J Carter
*Assistant Examiner* — Omar Rojas Cadima
(74) *Attorney, Agent, or Firm* — Haynes and Boone, LLP

(57) ABSTRACT

A ring-shaped light includes a ring-shaped frame, the ring-shaped frame having a void portion in the middle of the ring-shaped frame, such that when the ring-shaped frame is located on a mirror, a face of a user looking into the mirror through the void is viewable to the user. The ring-shaped light further includes a plurality of light sources mounted around the ring-shaped frame in a circular fashion. The ring-shaped light further includes a bridge, the bridge located in a bottom section of the void, the bridge including a slot for receiving a smartphone. The ring-shaped light further includes a sensor for activating the plurality of light sources. The ring-shaped light further includes a mounting system integrated with the frame, the mounting system including a plurality of discs, mountable via adhesive to the mirror, and a plurality of recesses each interfacing with the plurality of discs, the plurality of discs being made of magnetic material and each of the plurality of recesses including a magnet to hold the plurality of discs, the plurality recesses sized and shaped in a complementary fashion to the plurality of discs.

20 Claims, 21 Drawing Sheets

(51) Int. Cl.
| | |
|---|---|
| *F21V 23/04* | (2006.01) |
| *F21V 21/08* | (2006.01) |
| *F21V 21/096* | (2006.01) |
| *F21V 21/092* | (2006.01) |
| *F21Y 115/10* | (2016.01) |
| *F21Y 103/33* | (2016.01) |
| *H05B 45/20* | (2020.01) |

(52) U.S. Cl.
CPC .......... *F21V 21/096* (2013.01); *F21V 23/003* (2013.01); *F21V 23/0464* (2013.01); *F21Y 2103/33* (2016.08); *F21Y 2115/10* (2016.08); *H05B 45/20* (2020.01)

(58) Field of Classification Search
CPC .... A46B 15/0036; G03B 15/03; G03B 15/05; G06F 3/0488
See application file for complete search history.

(56) References Cited

U.S. PATENT DOCUMENTS

| | | | |
|---|---|---|---|
| 1,138,552 A | 5/1915 | Goddard | |
| 2,004,166 A | 6/1925 | Low | |
| 3,325,639 A * | 6/1967 | King | F16B 47/00 |
| | | | 362/270 |
| D208,234 S | 8/1967 | Ely | |
| 3,435,199 A | 3/1969 | Ely | |
| 3,732,702 A | 5/1973 | Desch | |
| 3,936,671 A | 2/1976 | Bobrick et al. | |
| D254,208 S | 2/1980 | Breslow | |
| D309,833 S | 8/1990 | Wahl | |
| 5,235,500 A | 8/1993 | Sapper | |
| 5,392,162 A | 2/1995 | Glucksman | |
| D379,125 S | 5/1997 | Simjian | |
| 5,690,420 A | 11/1997 | Saldana, Sr. | |
| D409,003 S | 5/1999 | Scavini | |
| 5,997,149 A | 12/1999 | Chu | |
| D425,313 S | 5/2000 | Zadro | |
| D426,182 S | 6/2000 | Brown | |
| D431,375 S | 10/2000 | Zadro | |
| 6,158,877 A | 12/2000 | Zadro | |
| 6,241,357 B1 | 6/2001 | Lee | |
| 6,273,585 B1 | 8/2001 | Wu | |
| 6,305,809 B1 | 10/2001 | Zadro | |
| D474,432 S | 5/2003 | Good | |
| 6,604,836 B2 | 8/2003 | Carlucci et al. | |
| 6,749,160 B1 | 6/2004 | Richter | |
| 6,886,351 B2 | 5/2005 | Palfy et al. | |
| D508,883 S | 8/2005 | Falconer | |
| D509,369 S | 9/2005 | Snell | |
| D511,413 S | 11/2005 | Yue | |
| 7,004,599 B2 | 2/2006 | Mullani | |
| 7,048,406 B1 | 5/2006 | Shih | |
| 7,090,378 B1 | 8/2006 | Zadro | |
| D532,981 S | 12/2006 | Zadro | |
| 7,233,154 B2 | 6/2007 | Groover et al. | |
| 7,341,356 B1 | 3/2008 | Zadro | |
| D569,671 S | 5/2008 | Thompson et al. | |
| 7,393,115 B2 | 7/2008 | Tokushita et al. | |
| D574,159 S | 8/2008 | Howard | |
| 7,513,476 B1 | 4/2009 | Huang | |
| D635,009 S | 3/2011 | Paterson | |
| D639,077 S | 6/2011 | Gordon | |
| D647,444 S | 10/2011 | Manukyan et al. | |
| D649,790 S | 12/2011 | Pitot | |
| D652,220 S | 1/2012 | Pitot | |
| D656,979 S | 4/2012 | Yip et al. | |
| D657,425 S | 4/2012 | Podd | |
| D657,576 S | 4/2012 | Pitot | |
| 8,162,502 B1 | 4/2012 | Zadro | |
| D658,604 S | 5/2012 | Egawa et al. | |
| D660,367 S | 5/2012 | Podd | |
| D660,368 S | 5/2012 | Podd | |
| D660,369 S | 5/2012 | Podd | |
| D665,030 S | 8/2012 | Podd | |
| D666,010 S | 8/2012 | Farley | |
| 8,356,908 B1 | 1/2013 | Zadro | |
| 8,382,189 B2 | 2/2013 | Li et al. | |
| D679,102 S | 4/2013 | Gilboe et al. | |
| D689,701 S | 9/2013 | Mischel, Jr. et al. | |
| D699,448 S | 2/2014 | Yang et al. | |
| D699,952 S | 2/2014 | Yang et al. | |
| D701,050 S | 3/2014 | Yang et al. | |
| D702,048 S | 4/2014 | Fung | |
| D711,871 S | 8/2014 | Daniel | |
| D711,874 S | 8/2014 | Cope | |
| 8,801,225 B2 | 8/2014 | Dalsgaard | |
| D712,963 S | 9/2014 | Fleet | |
| 8,915,629 B2 | 12/2014 | Madireddi et al. | |
| D736,001 S | 8/2015 | Yang et al. | |
| D737,059 S | 8/2015 | Tsai | |
| D737,060 S | 8/2015 | Yang et al. | |
| D737,580 S | 9/2015 | Tsai | |
| D738,118 S | 9/2015 | Gyanendra et al. | |
| 9,232,846 B2 | 1/2016 | Fung | |
| D751,829 S | 3/2016 | Yang et al. | |
| D754,446 S | 4/2016 | Yang et al. | |
| 9,347,660 B1 | 5/2016 | Zadro | |
| D785,345 S | 5/2017 | Yang et al. | |
| 9,638,410 B2 | 5/2017 | Yang | |
| 2002/0196333 A1 | 12/2002 | Gorischek | |
| 2003/0030063 A1 | 2/2003 | Sosniak et al. | |
| 2003/0031010 A1 | 2/2003 | Sosniak et al. | |
| 2004/0020509 A1 | 2/2004 | Waisman | |
| 2005/0243556 A1 | 11/2005 | Lynch | |
| 2006/0186314 A1 | 8/2006 | Leung | |
| 2007/0120027 A1 | 5/2007 | Chang | |
| 2008/0057889 A1 * | 3/2008 | Jan | H04B 1/034 |
| | | | 455/185.1 |
| 2008/0130305 A1 | 6/2008 | Wang et al. | |
| 2008/0258110 A1 | 10/2008 | Oshio | |
| 2008/0298080 A1 | 12/2008 | Wu et al. | |
| 2009/0027902 A1 | 1/2009 | Fielding et al. | |
| 2009/0301927 A1 | 12/2009 | Fvlbrook et al. | |
| 2009/0308993 A1 | 12/2009 | Chang | |
| 2010/0118520 A1 | 5/2010 | Stern et al. | |
| 2010/0296298 A1 | 11/2010 | Martin, Jr. | |
| 2011/0058269 A1 | 3/2011 | Su | |
| 2011/0163211 A1 | 7/2011 | Cicco | |
| 2011/0211079 A1 | 9/2011 | Rolston | |
| 2011/0261568 A1 | 10/2011 | Dalsgaard | |
| 2012/0229789 A1 | 9/2012 | Kang et al. | |
| 2012/0292466 A1 | 11/2012 | Song | |
| 2013/0026512 A1 | 1/2013 | Tsai | |
| 2013/0077292 A1 | 3/2013 | Zimmerman | |
| 2013/0190845 A1 | 7/2013 | Liu et al. | |
| 2013/0235610 A1 | 9/2013 | Yang et al. | |
| 2014/0362562 A1 | 12/2014 | Fung | |
| 2015/0060431 A1 | 3/2015 | Yang et al. | |
| 2016/0255941 A1 * | 9/2016 | Yang | A45D 42/10 |
| 2016/0277660 A1 * | 9/2016 | Kaiser | H04N 5/2252 |
| 2017/0054885 A1 | 2/2017 | Rolston | |
| 2017/0118385 A1 * | 4/2017 | Vargas | A45D 42/10 |
| 2018/0268747 A1 | 9/2018 | Braun | |

FOREIGN PATENT DOCUMENTS

| | | |
|---|---|---|
| DE | 20014279 U1 | 2/2001 |
| DE | 102004042929 A1 | 3/2006 |
| DE | 202009004795 U1 | 9/2009 |
| DE | 202010000170 U1 | 7/2010 |
| EP | 1792553 A2 | 6/2007 |
| EP | 2636336 A1 | 9/2013 |
| JP | 2008073174 A | 4/2008 |
| JP | 2016-177963 A | 10/2016 |
| WO | WO2017019610 A1 | 2/2017 |
| WO | WO2017162504 A1 | 9/2017 |

OTHER PUBLICATIONS

International Search Report and Written Opinion dated Jan. 10, 2020 issued in related PCT App. No. PCT/US19/56392 (17 pages).

(56) References Cited

OTHER PUBLICATIONS

"New Popsocket Cell Phone Accessorie for iPhone, Samsung, Android" (Pop Mount) Jul. 5, 2018 (Jul. 5, 2018) [online] retrieved from (URL:https://www.youtube.com/watch?v=oLv-osdCnY) entire document.
"My Beauty Light" retrieved from the internet on Aug. 28, 2019 <https://www.my-beauty-light.de/en/>.
"Studio Glow Make Up Light Bright 4 LED Bulbs Battery Powered" retrieved from the internet on Aug. 28, 2019 < https://www.lelong.com.my/studio-glow-light-super-bright-4-led-bulbs-battery-powered-gdeal-F1350601-2007-01-Sale-1.htm>.

\* cited by examiner

SYSTEMS AND METHODS FOR A MIRROR MOUNTED LIGHT WITH MOBILE DEVICE MOUNTING

BACKGROUND

In an increasingly image-conscious world, people view their appearance as an extension of their personal brand. As such, high-quality and flattering photographs and videos are essential. Whether taken with a smartphone or traditional camera, good images require a proper and professional light source, the best being a round light. Therefore, it would be desirable to have a consumer-friendly iteration of professional round lighting made available for applying makeup, grooming, and taking photos/video at home.

Poor lighting may affect the way a user sees themselves in the mirror. This may have a variety of effects on the user. The user may not properly apply makeup. The user may take a mirror selfie and the result may be suboptimal. Therefore, it is desirable to provide for a system that provides high quality lighting.

BRIEF SUMMARY

In one embodiment, a ring-shaped light includes a ring-shaped frame, the ring-shaped frame having a void portion in the middle of the ring-shaped frame, such that when the ring-shaped frame is located on a mirror, a face of a user looking into the mirror through the void is viewable to the user. The ring-shaped light further includes a plurality of light sources mounted within the ring-shaped frame in a circular fashion. The ring-shaped light further includes a sensor for sensing ambient light and controlling the plurality of light sources according to the ambient light. The ring-shaped light further includes a bridge, the bridge located in a bottom section of the void, the bridge including a slot for receiving a smartphone. The ring-shaped light further includes a sensor for activating the plurality of light sources. The ring-shaped light further includes a mounting system integrated with the frame, the mounting system including a plurality of discs, mountable via adhesive to the mirror, and a plurality of recesses each interfacing with the plurality of discs, the plurality of discs being made of magnetic material and each of the plurality of recesses including a magnet to hold the plurality of discs, the plurality recesses sized and shaped in a complementary fashion to the plurality of discs. In one alternative, the plurality of light sources are LEDs and the LEDs provide a Color Rendering Index (CRI) of greater than 90. In another alternative, the ring-shaped light further includes a microprocessor for controlling the plurality light sources to produce light in a plurality of intensities, wherein one of the plurality of intensities has a color temperature similar to daylight. Alternatively, the color temperature similar to daylight is 2700K to 5600K.

In one embodiment, a lighting device includes a frame, having an interior cutout area. The lighting device further includes a plurality of light sources mounted in the frame. The lighting device further includes a sensor for detecting ambient light and brightness and controlling the plurality of light sources. The lighting device further includes a mounting system, for mounting the frame on a mirror, integrated into the frame. The lighting device further includes a bridge connected to the frame, located in the interior cutout, the bridge including a holding location for a mobile device. In one alternative, the plurality of light sources is mounted in a circular fashion within the cutout area. In another alternative, the plurality of light sources are LEDs. Alternatively, the sensor for detecting ambient light controls the plurality of light sources to provide brightness and intensity matching ambient light. Alternatively, the LEDs provide a Color Rendering Index (CRI) of greater than 90 In another alternative, the mounting system includes a plurality of discs, the plurality of discs including adhesive for mounting on a surface, the frame including a plurality of slots sized to mate with the plurality of discs, the plurality of discs each including magnetic material, the plurality of slots each including a magnet for attracting one of the plurality of discs and there by cooperate to hold the lighting device. Alternatively, the lighting device further includes a switch mounted on the frame for controlling the plurality of light sources. In some configurations, the sensor is a touch sensor. In another alternative, the switch is a capacitance switch. Alternatively, the lighting device includes a microprocessor for controlling the plurality light sources to produce light in a plurality of intensities, wherein one of the plurality of intensities has a color temperature like daylight. In another alternative, the color temperature similar to daylight is 2700K to 5600K. Alternatively, the bridge spans a lower portion of the cutout area and includes a slot for receiving a mobile device. In another alternative, the mobile device is a smartphone. Alternatively, the slot is padded. In another alternative, the bridge is positioned such that the smartphone is located in an optimal position to take a picture of a user. Optionally, the microprocessor includes a communication system for communicating with a smartphone, allowing the smartphone to control the plurality of light sources. Alternatively, the lighting device further includes, a suction cup connected to the frame via a loop for mounting the lighting device.

In one embodiment, a method of using a ring-shaped light, includes providing a ring-shaped light, including, a ring-shaped frame, the ring-shaped frame having a void portion in the middle of the ring-shaped frame, such that when the ring-shaped frame is located on a mirror, a face of a user looking into the mirror through the void is viewable to the user. The ring-shaped light further includes a plurality of light sources mounted within the ring-shaped frame in a circular fashion. The ring-shaped light further includes a bridge, the bridge located in a bottom section of the void, the bridge including a slot for receiving a smartphone. The ring-shaped light further includes a sensor for activating the plurality of light sources. The ring-shaped light further includes a sensor for sensing ambient light and controlling the plurality of light sources according to the ambient light. The ring-shaped light further includes a mounting system integrated with the frame, the mounting system including a plurality of discs, mountable via adhesive to the mirror, and a plurality of recesses each interfacing with the plurality of discs, the plurality of discs being made of magnetic material and each of the plurality of recesses including a magnet to hold the plurality of discs, the plurality recesses sized and shaped in a complementary fashion to the plurality of discs. The method further includes mounting the ring-shaped light on the mirror using the mounting system. The method further includes activating the ring-shaped light with the sensor. The method further includes applying makeup to the user using the mirror. The method further includes placing the smartphone in the bridge. The method further includes setting a timer on the smartphone for taking a picture and taking a picture of the user using the smartphone in the bridge.

DETAILED DESCRIPTION

Certain terminology is used herein for convenience only and is not to be taken as a limitation on the embodiments of the systems and methods for a mirror mounted light with mobile device mounting. Various embodiments of a mirror mounted light include, a discrete mounting mechanism for the mirror mounted light. The mirror mounted light may also be referred to as a ring-shaped light. Various embodiments include a mounting area for a smartphone, also called a bridge. The bridge may be a bridge as shown in some configurations. The bridge may also be a slot that is contiguous with the edge of the ring-shaped light. The bridge includes a variety of designs, if the bridge is configured to hold a device (such as a smartphone) in position. Various embodiments include a color temperature sensor for providing light adjusted to match the color temperature and brightness of the room. Various embodiments include the ability to cycle through various color temperatures and brightness. In many embodiments, the ambient light may not hit the user at the correct angle and intensity. Therefore, in many embodiments, it is desirable provide a source of light that has the correct angle of incidence to the user. Typically, in many scenarios this is an orthogonal arrangement, since an orthogonal arrangement will create the fewest shadows.

In many scenarios, the user activates a mirror mounted light according to one the embodiments described herein. The sensor senses the color temperature and brightness of the room. In many scenarios, the sensor and associated logic slowly increase the color temperature and brightness provided by the mirror mounted light. Thereafter, a user may scroll through or otherwise activate various brightness settings as well as various color temperature settings.

Color temperature is typically measured kelvin (K). Cool colors such as white and blue typically have color temperatures of over 7000K. Warmer colors, e.g. yellow and orange, typically have lower color temperature. In many scenarios, if the color temperature is unbalanced, individuals may appear to have more imperfections or strange coloring if the light they are exposed to is imbalanced in relation to the light of the room. Therefore, it is in many embodiments desirable to match the color temperature and brightness of the room. For reference, daylight has a temperature of about 5200K (5600K at noon). Additionally, in many scenarios, a certain color rendering index is provided (CRI). The CRI provides the ability of a light source to accurately render all frequencies of the color spectrum compared to a perfect reference light on a scale of 1-100.

In many embodiments, the mirror mounted light provides for matching the color temperature of the ambient light and a high CRI. In alternatives, various other color temperatures may be provided, such as daylight or other lighting. In many embodiments, various color temperature settings are possible, those settings having a high CRI.

Figure 1:
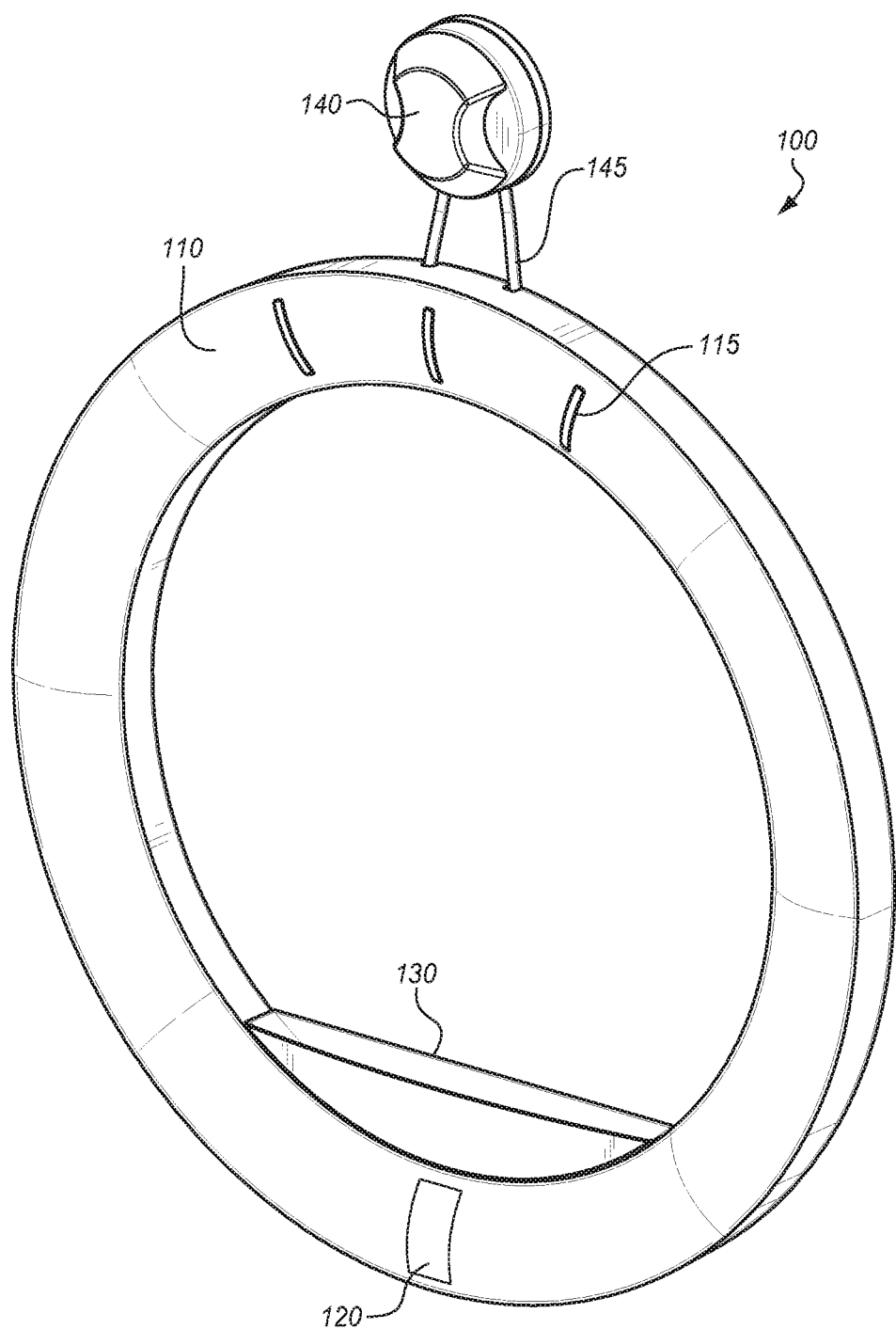
FIG. 1 shows one embodiment a mirror mounted light.

FIG. 1 shows a perspective view of one embodiment of a mirror mounted light 100. Mirror mounted light 100 includes a circular light source 110. The central area of the mirror mounted light 100 is empty. Circular light source includes a plurality of LEDs mounted in a circular fashion below the translucent outer cover (lens) is visible in this view.

The lens in many configurations is designed to give the appearance of a single light source. This is desirable both aesthetically for the user and it provides for an even light that assists in achieving the lighting goals described. In many embodiments, the lens is made from high density polyethylene (HDPE). HDPE may be used for its good light diffusing properties. Other material that provide for light diffusion may be used in alternatives. The lens shape was designed to encourage light to refract towards the user due to the lens outer edge being taller than the inner edge, which takes straight light and angles it inwards. In many configurations, in order provide for blending from one light grouping to the next, for the appearance of a single light source, a pitch to height ratio of greater than 1 is required. This means that the distance from one LED group to the next may be less than the distance from the LED group to the surface of the lens to meet this pitch to height ratio. In one embodiment, the LED pitch is 13.6 mm and our LED height to lens is 14.6 mm making our pitch to height ratio 1.07. The combination of proper material selection (HDPE), proper lens design, and proper LED placement should yield the appearance of a single light source. This lens may be used in the other embodiments described herein. This combination of the lens and the LEDs provides for an orthogonal source of light that completely surrounds the user with light due to the circular shape of the device. It should be noted, that although in many embodiments the device is ring shaped, in certain variations, other shapes may be utilized that provide for light that surrounds the face of the user. Such shapes may include, but are not limited to a triangle, a square, hexagon, an octagon, and various other geometries that include a multi-sided shape providing for a cutout in the center.

Sensors 115 sense the ambient light and communicate with a microprocessor in order to control the plurality of LEDs in fashion such the color temperature of the light matches the ambient light. Additionally, the brightness may be matched. In many scenarios a high CRI is also provided. Essentially, the sensor senses the ambient light and based on the procedures of the microprocessor included, the system determines what lights to activate and what levels to activate them. A touch sensor 120 is shown on the front of the device. Touch sensor 120 controls the operation of the mirror mounted light. Bridge 130 provides for a mounting area for a smart phone or tablet. Also visible in this view is suction hanger 140 including hanging ropes (or other hanging mechanisms). This suction hanger provides for a mounting apparatus on a mirror. Bridge 130 is essentially a slot, approximately sized for a smartphone or tablet.

Numerous alternatives are possible for bridge 130. Essentially, bridge 130 operates as a location for holding the smartphone, such that the smartphone may capture an image of the user. Generically, this may be termed a holder. The bridge version of the holder extends from the internal sides of the device. The holder portion may alternatively extend from the bottom of the device as well or may only extent part way to the device. In alternative embodiments a holder may hang from the interior edges of the device and provide a similar holding area.

In many embodiments, the ambient light sensor functions to analyze the light surrounding the device. A color sensor, which is sensitive to red, green, blue and white light, is used to find the relative brightness of the light as well as the associated color temperature. The values from the sensor are fed into the microcontroller, which calculates the color temperature and brightness of the ambient light. The microcontroller then uses the values to drive a combination of high and low color temperature LEDs. This provides the desired outputted color temperature to match the surrounding light. The unit can also use the brightness of the ambient light to adjust the brightness of the outputted light to ensure the light isn't too bright upon initial startup.

In many embodiments, a mirror mounted light includes numerous LEDs. The number of LEDs may range greatly and may be in the hundreds. In some embodiments, the device may include 5-200 LEDs. In one embodiment, a total of 152 LEDs is included. In this configuration, the 152 LEDs include 76 of the 5600K LEDs and 76 of the 2700K LEDs. Additionally, the design may include LEDs for indicators, such as 4 battery indicator LEDs. In many embodiments, it is desirable to include two sets of LEDs, some approx. 5600K LEDs and others approximately 2700K LEDs. This provides for various LEDs to be lit to match ambient light.

Figure 2:
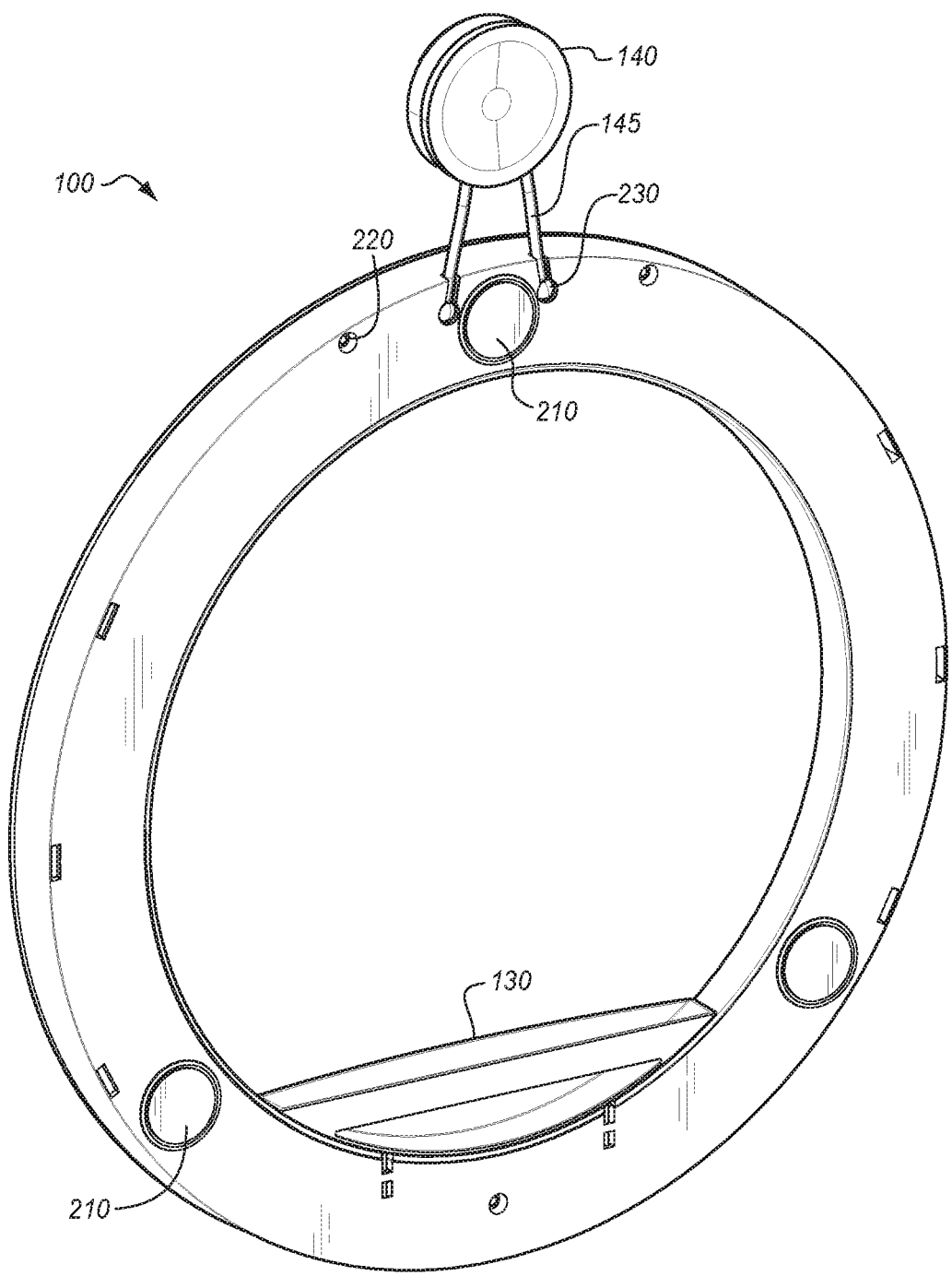
FIG. 2 shows a rear view of the mirror mounted light of FIG. 1.

FIG. 2 shows a rear view of mirror mounted light 100. Visible in this view are recesses 210. Recesses 210 include a magnet that provides for attraction to discs that are mounted via adhesive on a mirror. In such a way, the mirror mounted light 100 may be attached to a mirror. The discs that are used are typically somewhat thin and mirrored on the out facing side, such that, when the mirror mounted light is removed, the mirrored surfaces face outward, limiting the impact of viewing when the device is removed. Additionally, screw holes 220 are visible for holding the device together. At the top of the device 100, there are apertures 230 for the attachment of hangers 145, which typically includes flexible peg ends that interface with the apertures 230, passing through the widened portion, but are too thick to pass through the narrowed portion, thus holding the device.

Figure 3:
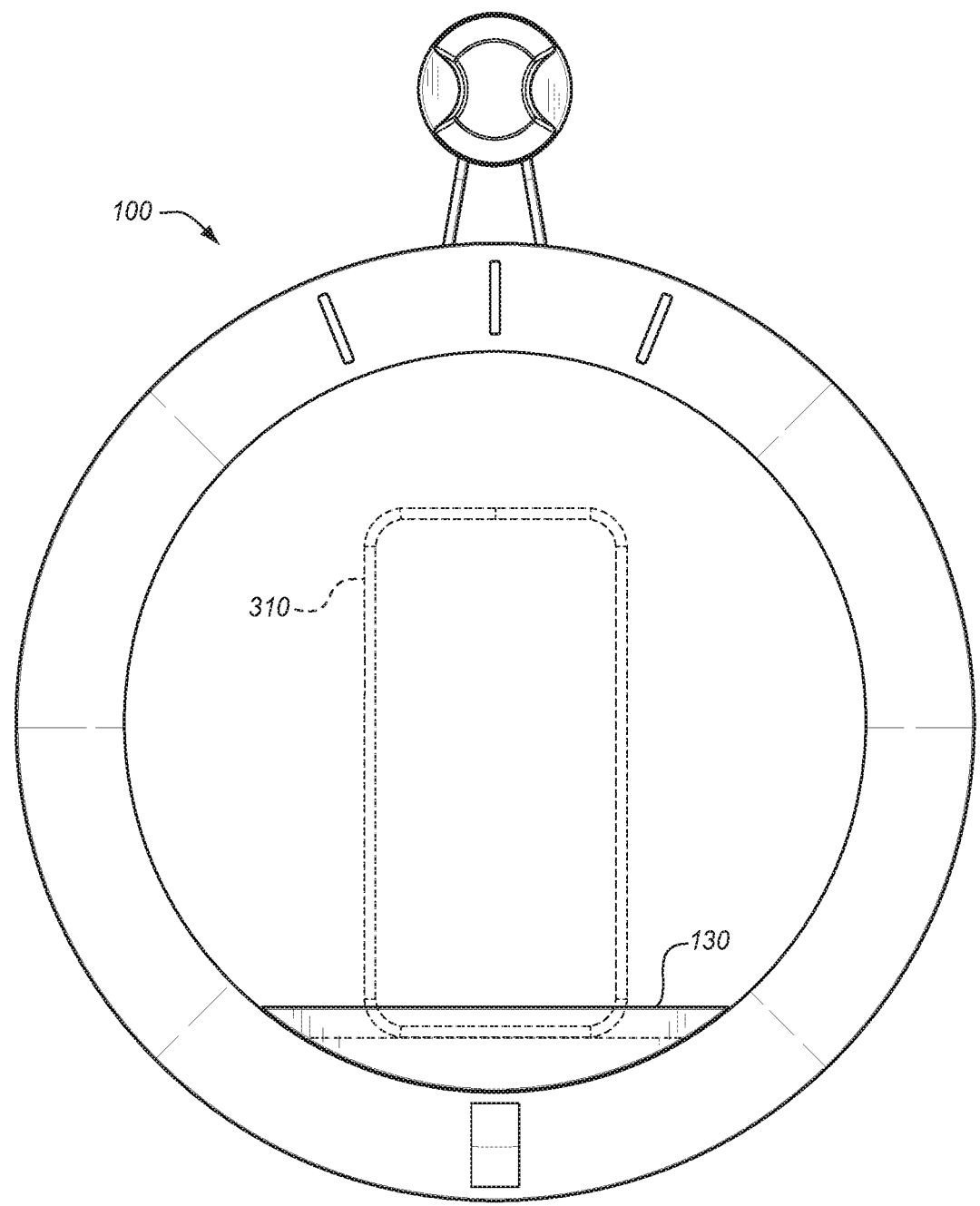
FIG. 3 shows a front view of the mirror mounted light of FIG. 1.

FIG. 3 shows a front view of the device 100, including a representation of a smartphone 310 in bridge 130. This provides the typical configuration for the device. In some configurations, the smartphone 310, may connect to the device 100. In some embodiments, this is done according to a Bluetooth protocol, however, numerous other protocols may be used, including such protocols as NFC, WiFi, or various alternative protocols may be used.

Figure 4:
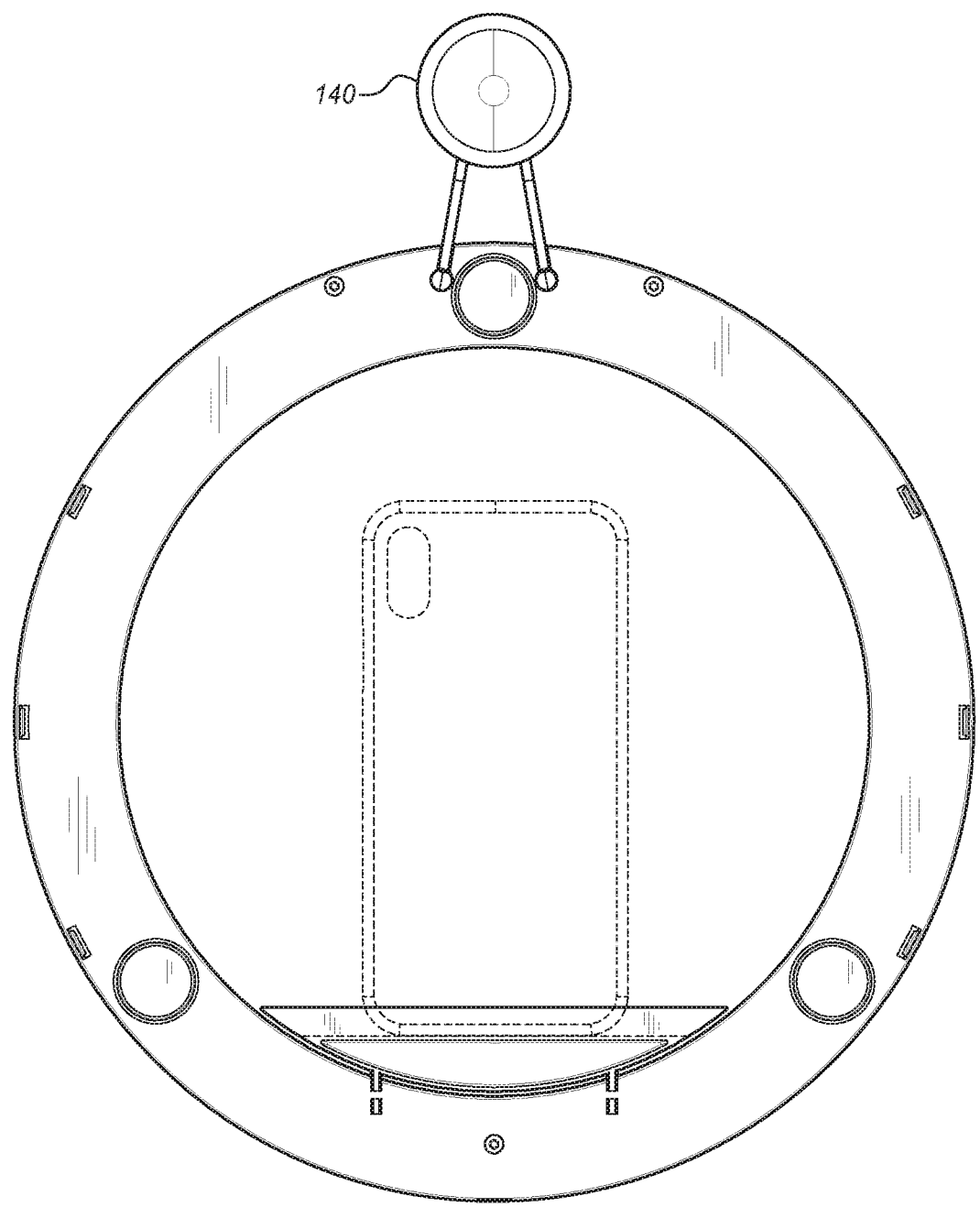
FIG. 4 shows a rear view of the mirror mounted light of FIG. 1.
Figure 5:
FIG. 5 shows a top view of the mirror mounted light of FIG. 1.
Figure 6:
FIG. 6 shows a bottom view of the mirror mounted light of FIG. 1.
Figure 7:
FIG. 7 shows a left side view of the mirror mounted light of FIG. 1.
Figure 8:
FIG. 8 shows a right-side view of the mirror mounted light of FIG. 1.

FIG. 4 shows a rear view of the mirror mounted light of FIG. 1, where suction hanger 140 is clearly visible. FIG. 5 shows a top view of the mirror mounted light of FIG. 1. FIG. 6 shows a bottom view of the mirror mounted light of FIG. 1. FIG. 7 shows a left side view of the mirror mounted light of FIG. 1. FIG. 8 shows a right-side view of the mirror mounted light of FIG. 1.

Figure 9:
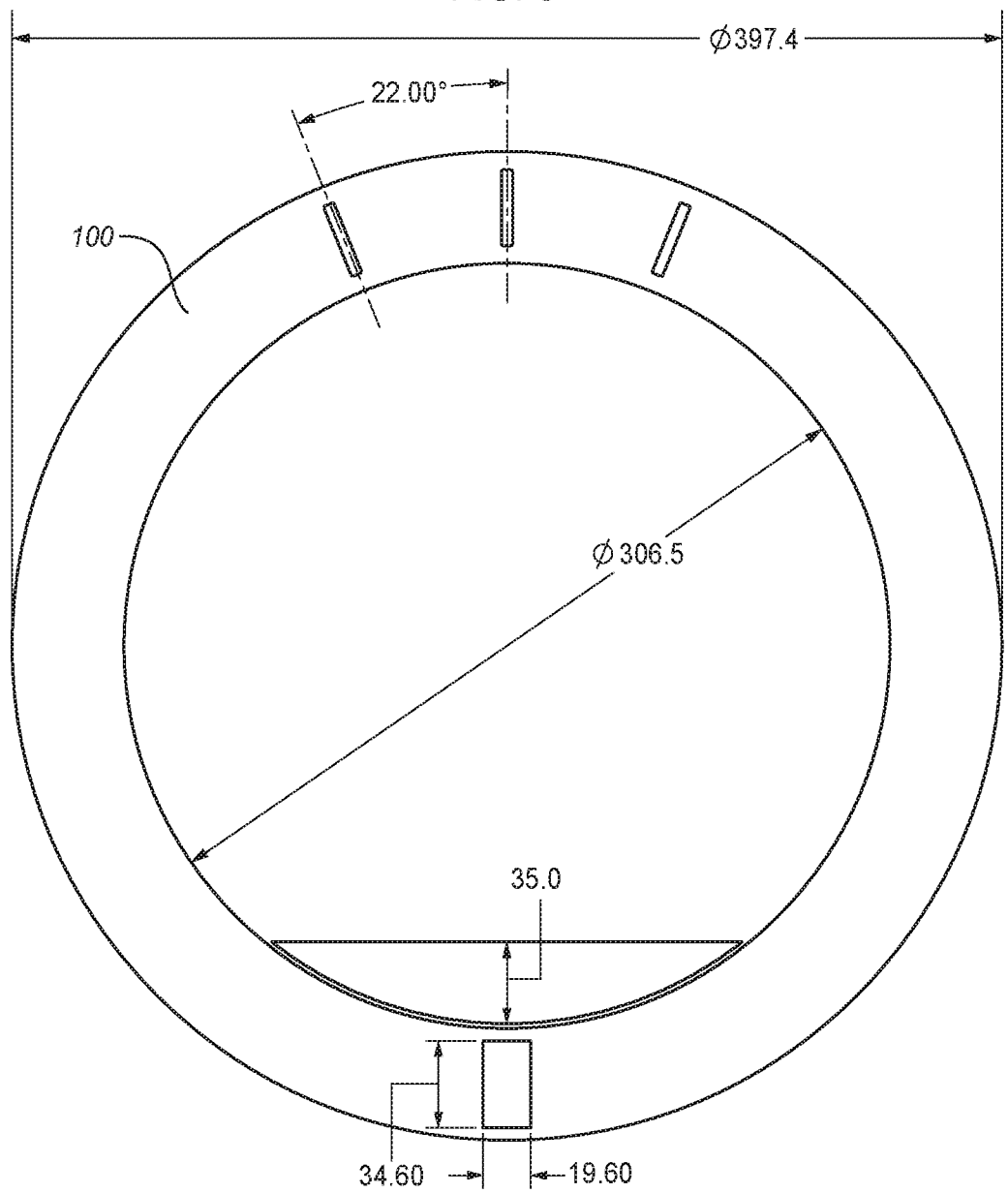
FIG. 9 shows another view of the mirror mounted light of FIG. 1.
Figure 10:
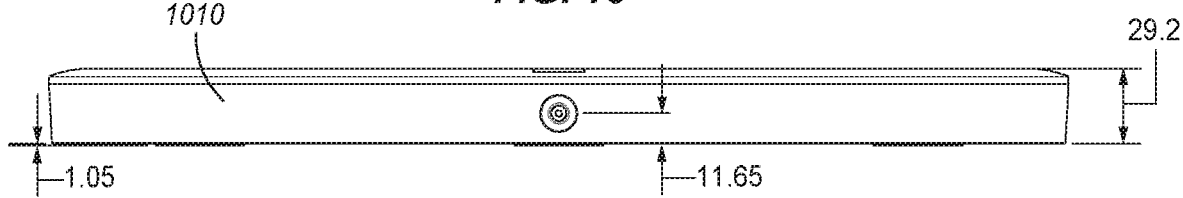
FIG. 10 shows a side view of the mirror mounted light of FIG. 9.

FIG. 9 shows another view of mirror mounted light 100 including dimensions. This bright 910 is contiguous with the circular frame portion 920 of the mirror mounted light 900. FIG. 10 shows a side view of the mirror mounted light 900. Shell 1010 is visible in this view. Shell 1010 is a frame shell composed of plastic, metal, or other material for holding the device together.

Figure 11:
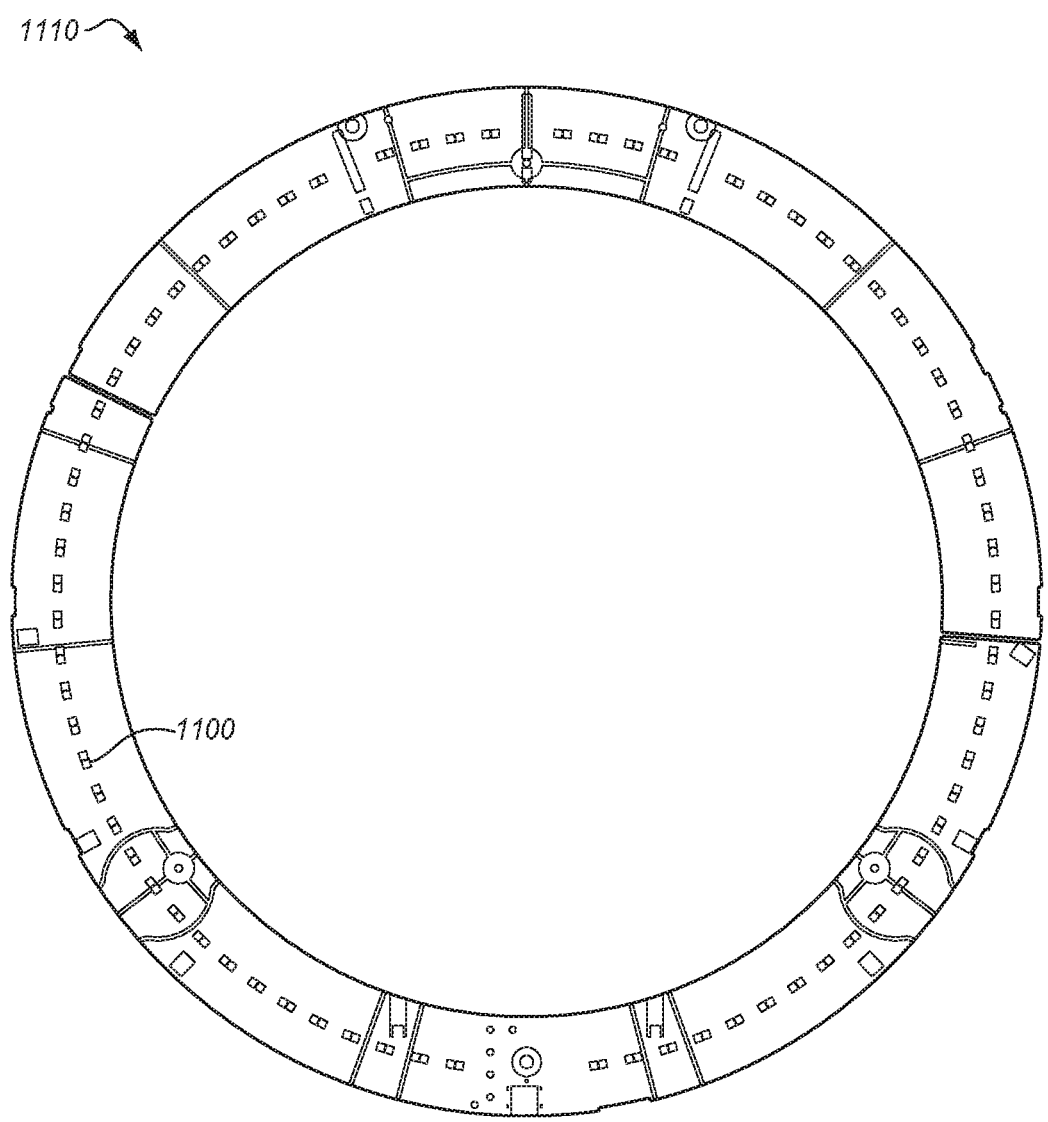
FIG. 11 show the board in the interior of the mirror mounted light of FIG. 9.

FIG. 11 shows the circuit board 1100 that is mounted inside the device. Circuit board 1100 includes various LEDs 1110 that providing lighting of the device. In the scenario shown there are 152 LEDs including 76 of the 5600K LEDs and 76 of the 2700K LEDs. In this way, various LEDs may be activated to provide for a lighting level (color temperature and brightness) that matches the environment.

Figure 12:
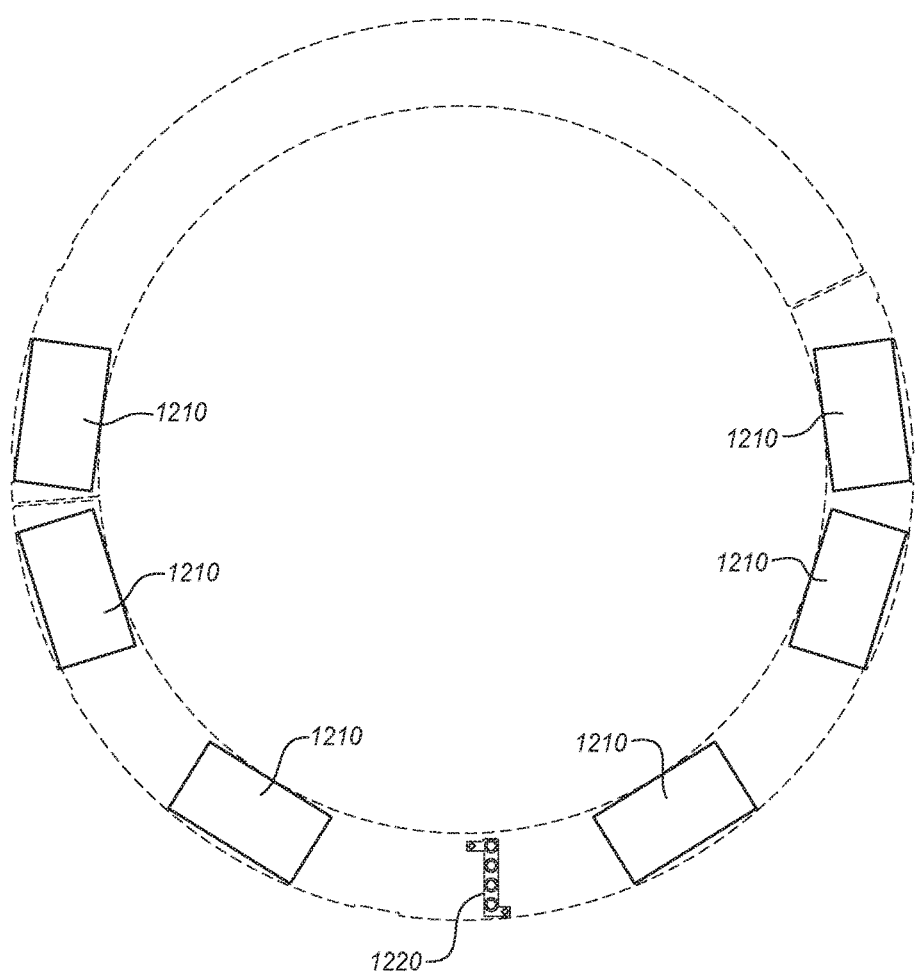
FIG. 12 shows the location of the batteries and the light pipe in the mirror mounted light of FIG. 9.

FIG. 12 shows the locations of batteries 1210 that sit on the underside of the circuit board 1100. Additionally, a light pipe 1220 is positioned next to the capacitance switch 930. This light pipe 1220 may provide an indication to the user. In many alternatives, the light pipe 1220 provides a flashing indication to the user when the device has reached a maximum light level.

In relation to capacitance switch 930, various methods of operation may be employed and executed by the logic implemented in a microprocessor or other computing device that is part of the system. In one embodiment, the user may touch capacitance switch 930 to activate the device. Immediately upon actuation, the system start-ups and reads the light level of the room. The system them outputs light that matches the color temperature of the room. The brightness output may be slightly higher than that of the ambient light. Subsequently, if the user actuates the capacitance switch by tapping it, for every tap the device will change light intensity levels, cycling through by increasing the light level with every touch until the highest level is reached and then skipping to the lowest level of intensity and continuing to cycle up in intensity for each touch. Additionally, the method of actuation may include that when the user holds on the capacitance switch, the system cycles through various color temperatures, gradually increasing the color temperature of the light until the color temperature is at the maximum available color temperature and then switching to the coldest available color temperature and continuing to cycle. Additionally, the method of operation may include that once a set period of time passes, cycling ability for color temperature and intensity is shutoff by the system and any additional touches to the switch will deactivate the system. Alternatively, the system may be setup, after the additional activation startup, to receive taps or holds indefinitely, and once a tap or hold event occurs and a preset time passes, then set to cause additional touches to deactivate the device. In the examples above, although intensity changes are described in relation to taps, they may alternatively be switched to hold actions. Equally, although color temperature changes are described in terms of holds, they may equally be described controlled in terms of taps. Additionally, although the method describes cycling in terms of increasing intensity, in alternatives, the intensity may be set to decrease upon taps and then when the intensity is at the minimum intensity, switch to the highest intensity. Additionally, instead of flipping from the highest intensity to the lowest intensity when a touch is received at the highest intensity or flipping from the lowest intensity to the highest intensity when a touch is received at the lowest intensity, the system may simply change the cycling direction. For example, if the user is at the second highest intensity and touches to change the system to the highest intensity, if the user touches again at the highest intensity, the system may change the intensity to the second highest intensity and continue to cycle down with each touch. The same can be executed on the lowest end of the intensities. The color temperature may similarly be controlled, where the system cycles through color temperatures and flips or cycles through color temperatures and reverses direction. As described, both the tap-based control system and the hold-based control-based detection system generally rely in a digital type, step wise switching of intensities and color temperatures. A less digital or step wise system may also be utilized in the case of the hold-based system, where the system cycles in a more analog and gradual fashion as long as the hold is held.

Therefore, in one embodiment, a method of controlling a light source utilizing a single button includes providing a single button, the single button configured to receive and process a variety of capacitance-based touches by a user. The single button is linked to a microprocessor executing and configured to execute instructions for processing touches that the single button receives. The system is configured to active the light source upon a first touch. The light source is activated to provide a first intensity and a first color temperature. In the context of the ring-shaped light system, this first intensity and first color temperature are based on the intensity measured by a sensor. In many configurations, the first color temperature matches the color temperature of the ambient light. In many configuration, the intensity is at or somewhat higher than the intensity of the ambient light. The system is further configured to wait to detect additional touches for a set period of time. This may be a minute or less in many scenarios. In some scenarios this may be 15 seconds or less. In some scenarios this may be 10 seconds or less. In some scenarios this may be a minute or greater to the to the point of being indefinite/infinite. If the system detects a hold event, characterized by a user holding their finger on the single button such that the capacitance is changed, then the system will cycle through one of the intensity and color temperature until the hold is released. If the system detects a tap, then the system will cycle to the next setting of one of the intensity and color temperature. Upon each successive tap, the cycling to the next setting will occur again. Typically, if a hold is released or the tapping stops, and no more holds or taps are received for a preset period, then the light source will be set at whatever intensity and color temperature it is at and the next touch will deactivate the light source. Cycling can occur either according to a series where when the maximum intensity or color temperature is reached after cycling up, the lowest intensity or color temperature is set next, or after the maximum intensity or color temperature is reached after cycling up, the system starts to cycle down. In many configurations, the light pipe may flash or otherwise indicate when the maximum intensity or color temperature has been reached, in order to prevent the user from missing the maximum setting. The same may occur for any minimum setting of color temperature or intensity.

Figure 13:
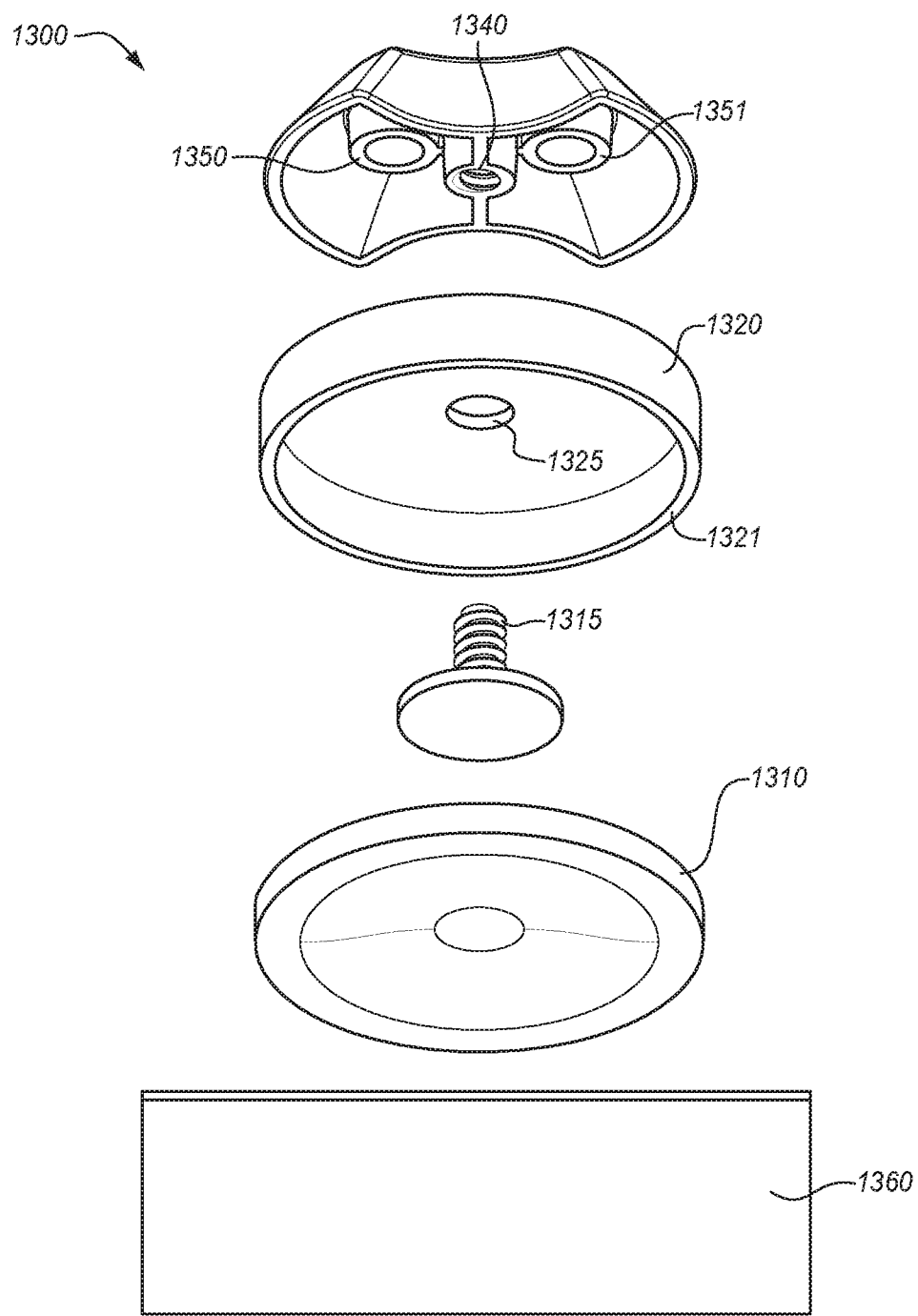
FIG. 13 shows one embodiment of a suction cup device holder.

FIG. 13 shows one embodiment of a suction cup holder 1300 for an electronic device, such as a smartphone. Suction cup holder 1300 include a suction cup 1310, a suction frame 1320, and a suction tensioning device 1330. Suction tensioning device 1330 in many embodiments also includes a magnet for attaching to a plate 1360 that is attached via adhesive (an adhesive back) to the electronic device or a case holding the electronic device. Other means of attachment to the electronic device are possible for plate 1360 such as intermediate holders or attachment mechanisms. In the embodiment shown, two magnets 1340, 1341 are used in suction tensioning device 1330. In operation, suction tensioning device 1330 has a first threaded piece 1315 that interfaces with a second threaded area 1340 on suction cup 1310. As the suction cup 1310 screws into the suction tensioning device 1330, via interaction between the first threaded piece 1315 and the second threaded area 1340, the middle portion of the suction cup is pulled up into the suction frame 1320, while the edge of the suction cup 1310 is kept in place by the edge of the suction frame 1320. As shown in the pictures, the first threaded piece 1315 includes a stop end that fits through the aperture in the suction cup 1310 to hold it in place and then screws into second threaded area 1340. In this way, when the device is on a surface, the screwing causes the suction cup 1310 to apply suction. Suction tensioning device may include a high friction outer surface to increase the stability of the attachment of the plate to the suction cup tensioning device. Additionally, magnets 1350, 1351 provide for attachment of plate 1360. The usage of two magnets in some embodiments is thought to be advantageous because it prevents the mobile device from rotating when plate 1360 is attached to magnets 1350, 1351. In such a scenario, the plate is shaped such that it prevents the rotation and fit on the two magnets. As shown, plate 1360 may have a rectangular shape. Other shapes providing a long axis to contact may be used. A single magnet may be used in some embodiments, however, the mobile device attached to the plate may not be as stable in such embodiments, and may rotate. Using the suction cup holder 1300, the phone or other electronic device may be mounted in the center of embodiments of the lighting device. Additionally, the suction cup holder 1300 may be used anywhere that it can create suction.

Figure 14:
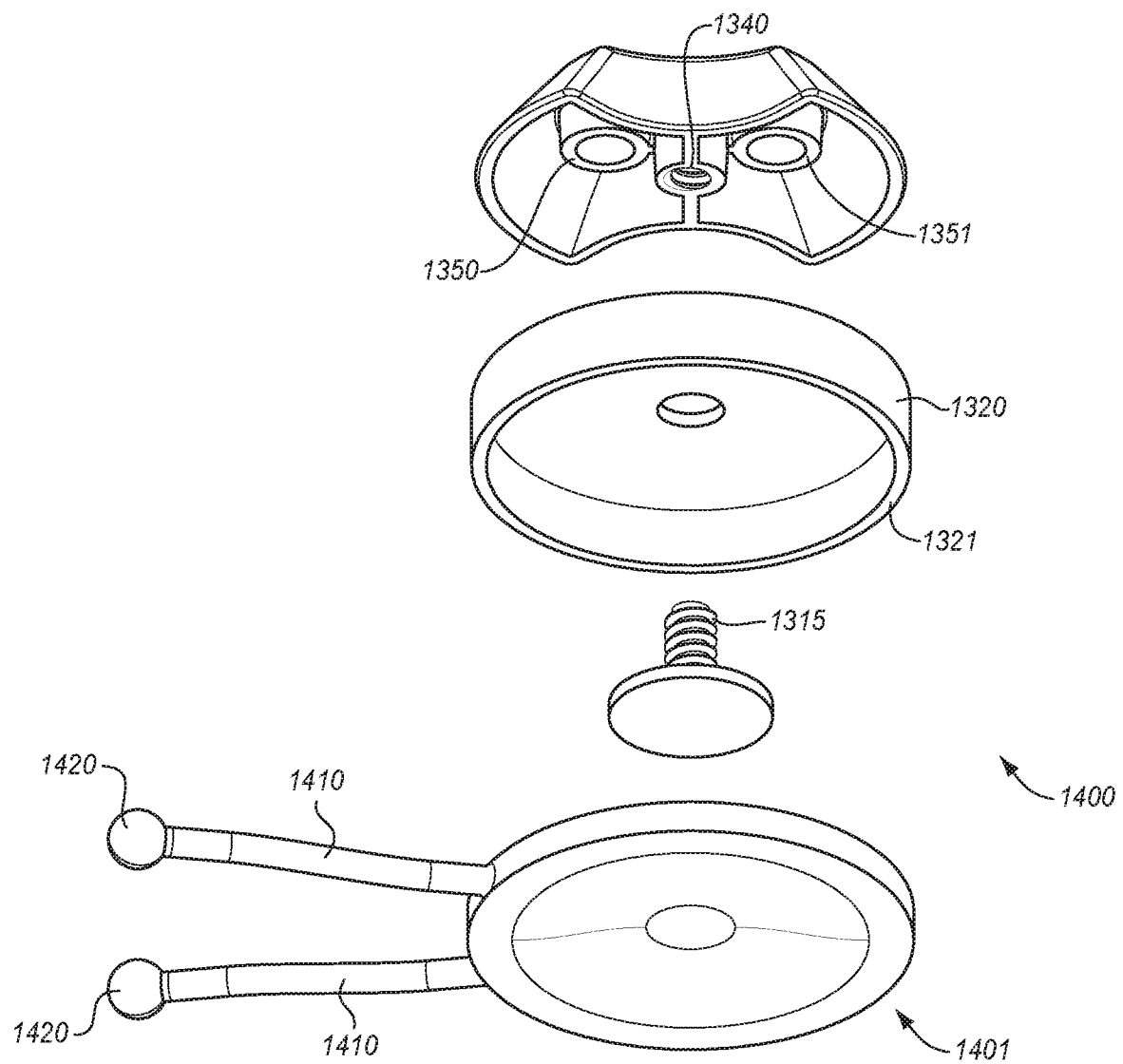
FIG. 14 shows one embodiment of a suction cup hanging device.
Figure 15:
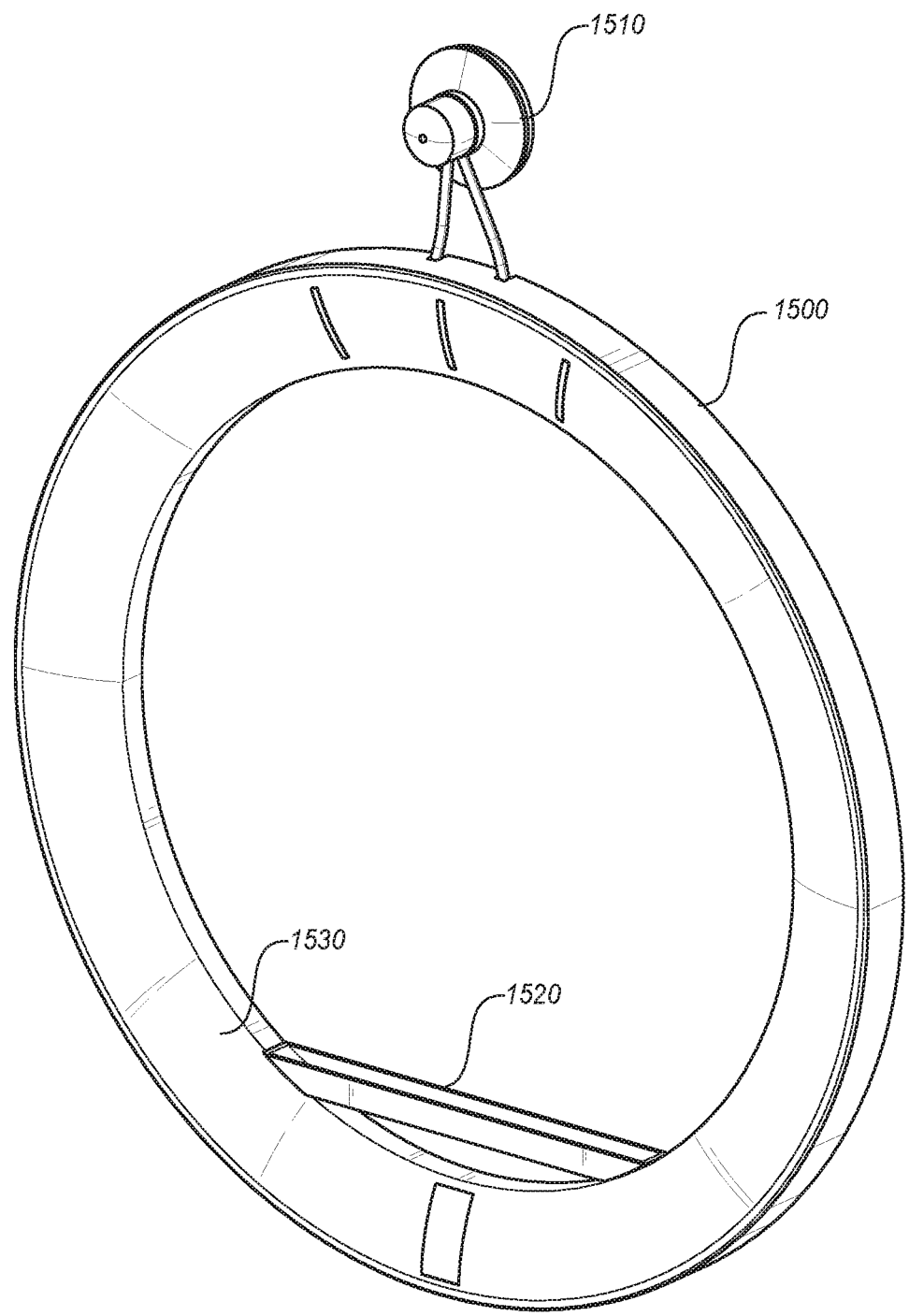
FIGS. 15-22 show an alternative embodiment of a mirror mounted light.
Figure 16:
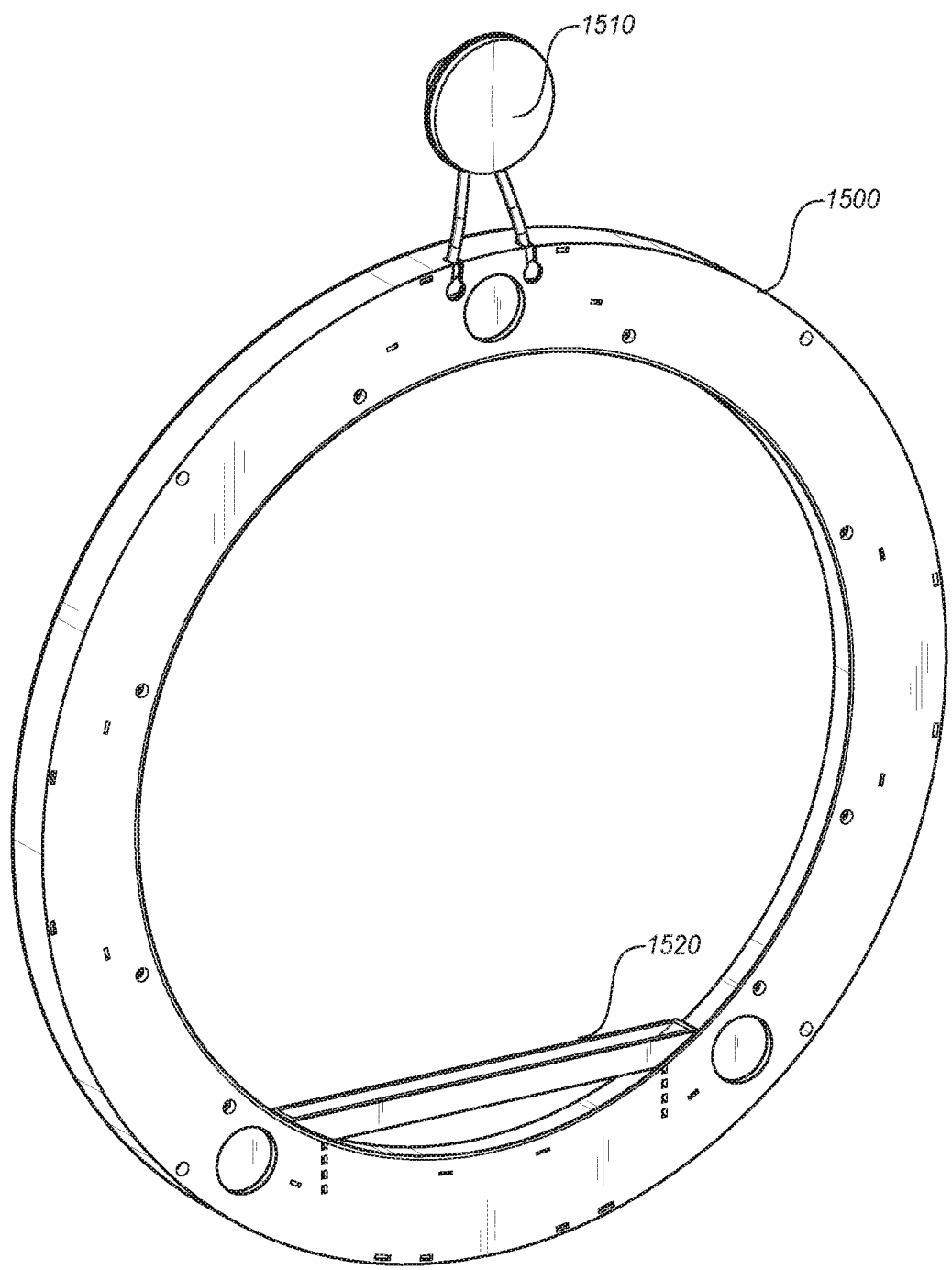
Figure 17:
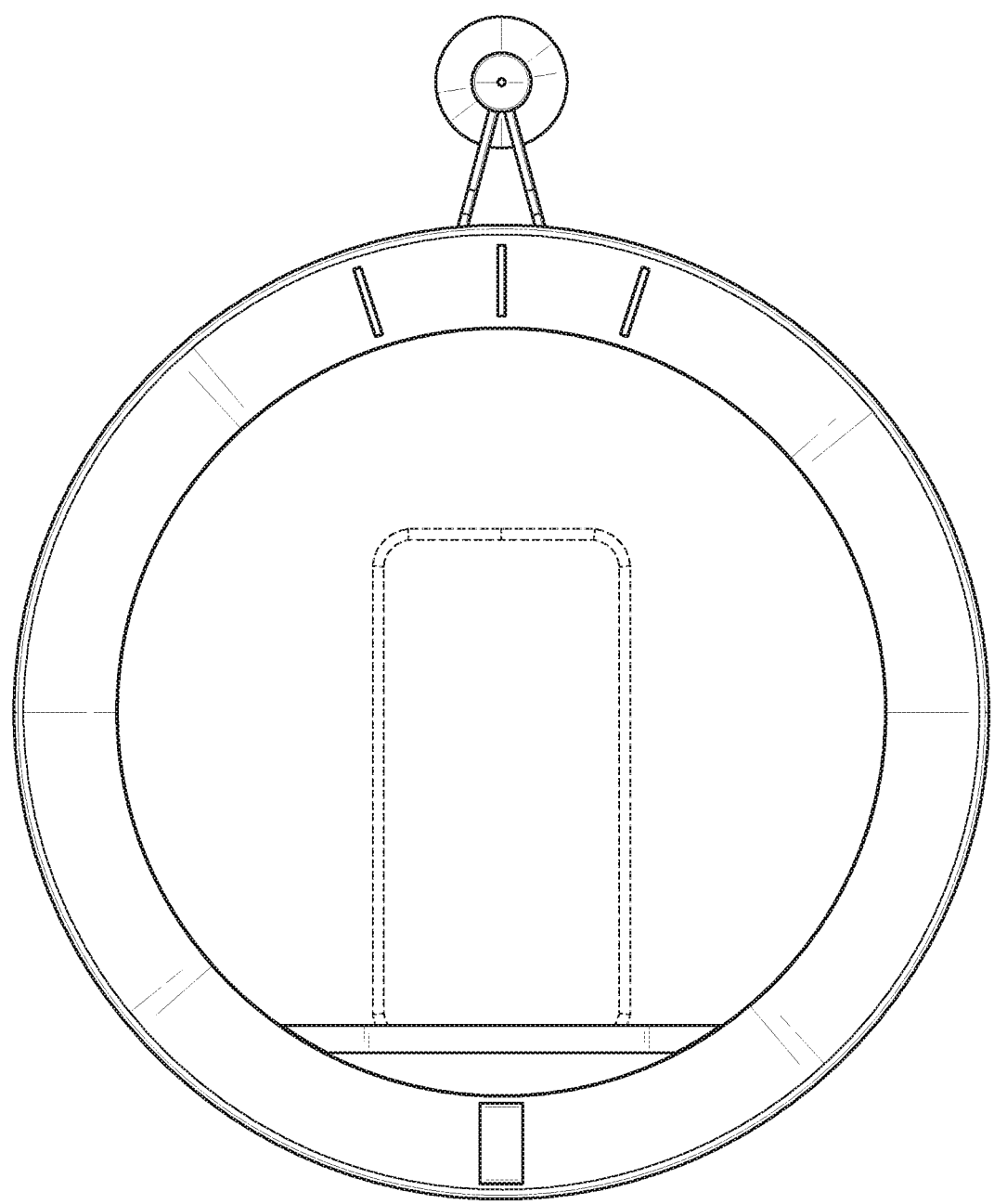
Figure 18:
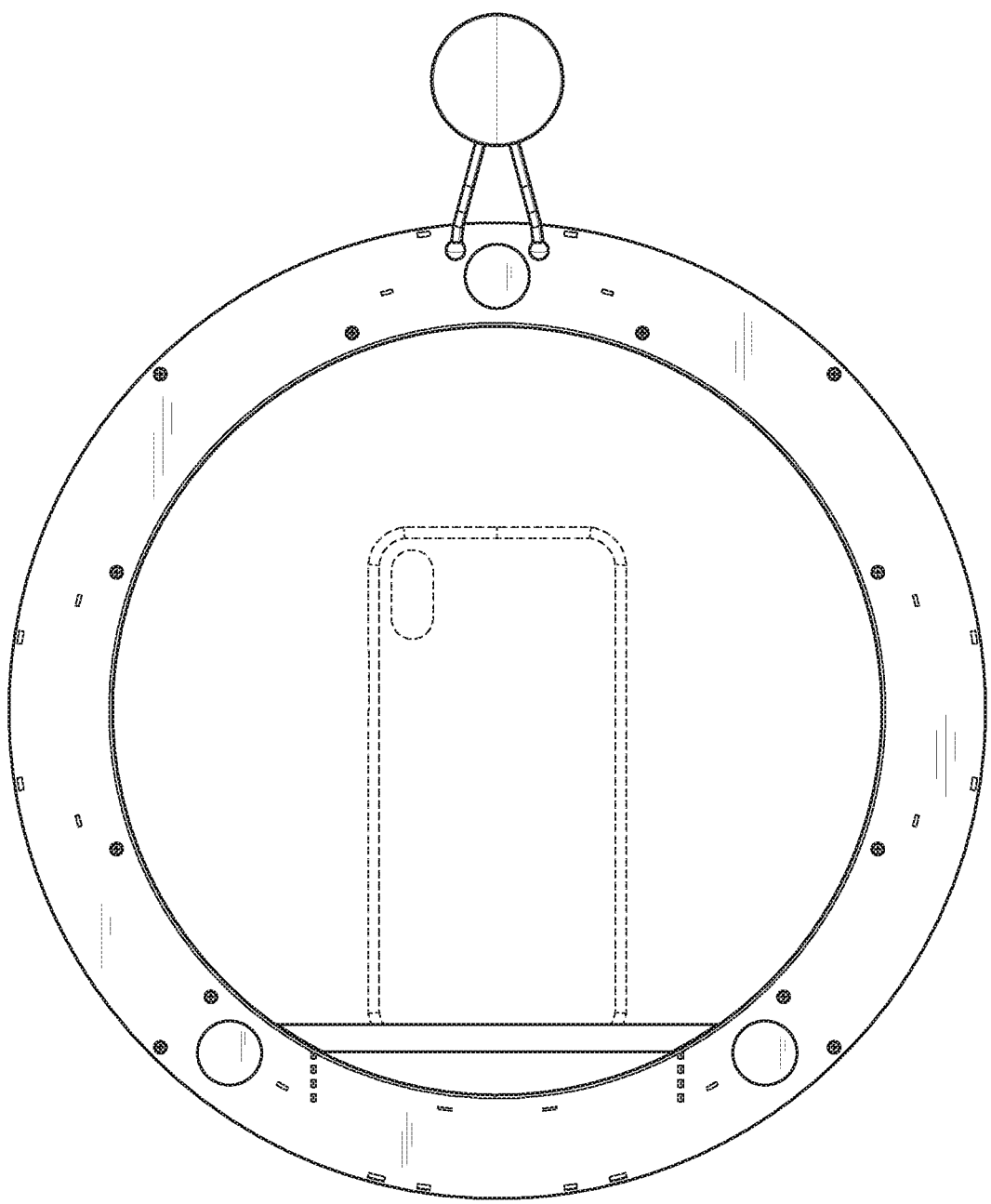
Figure 19:
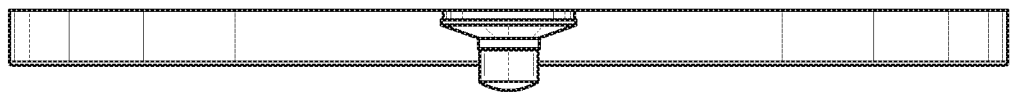
Figure 20:
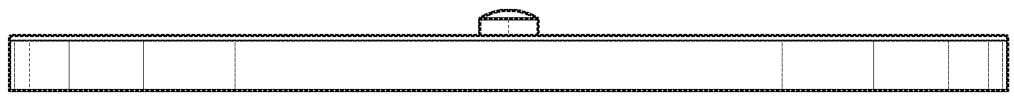
Figure 21:
Figure 22:
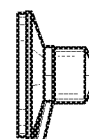
Figure 23:
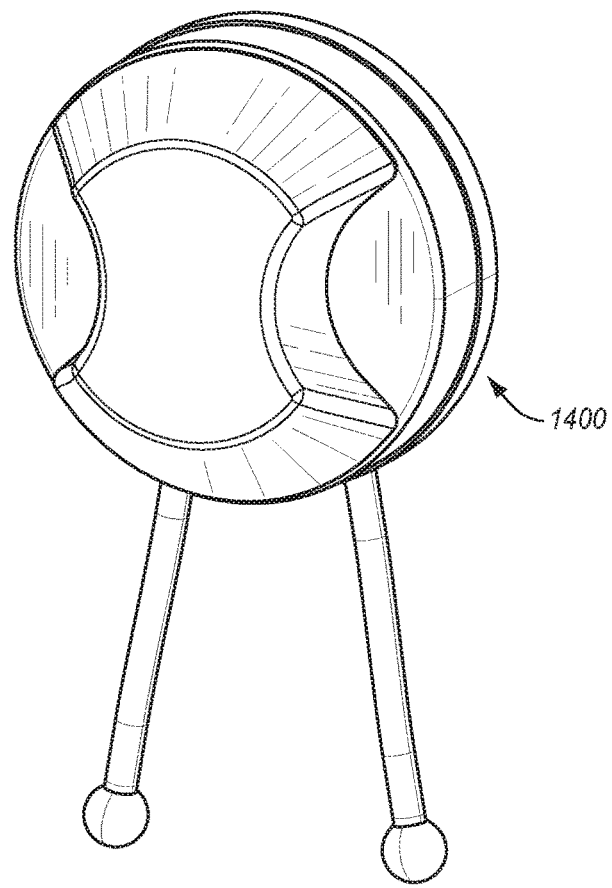
FIGS. 23-30 show additional assembled views the suction cup holder of FIG. 14.
Figure 24:
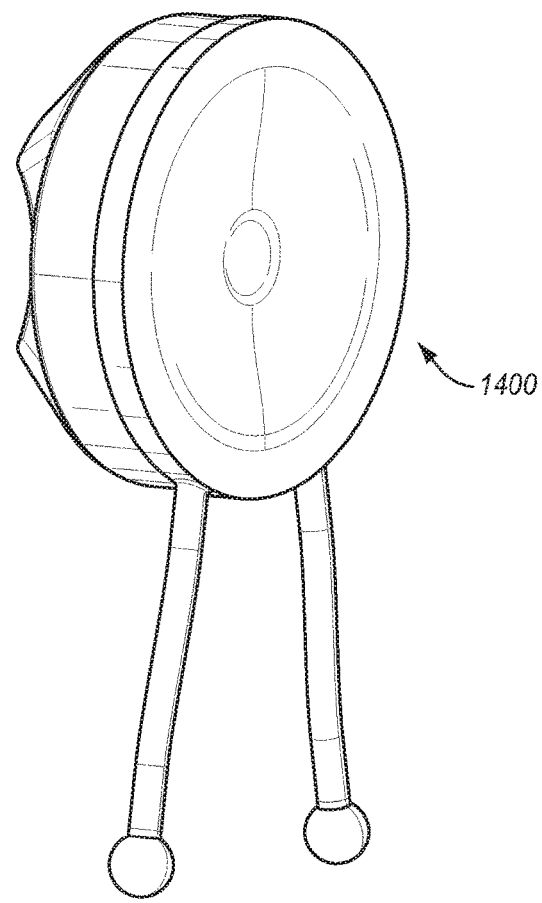
Figure 25:
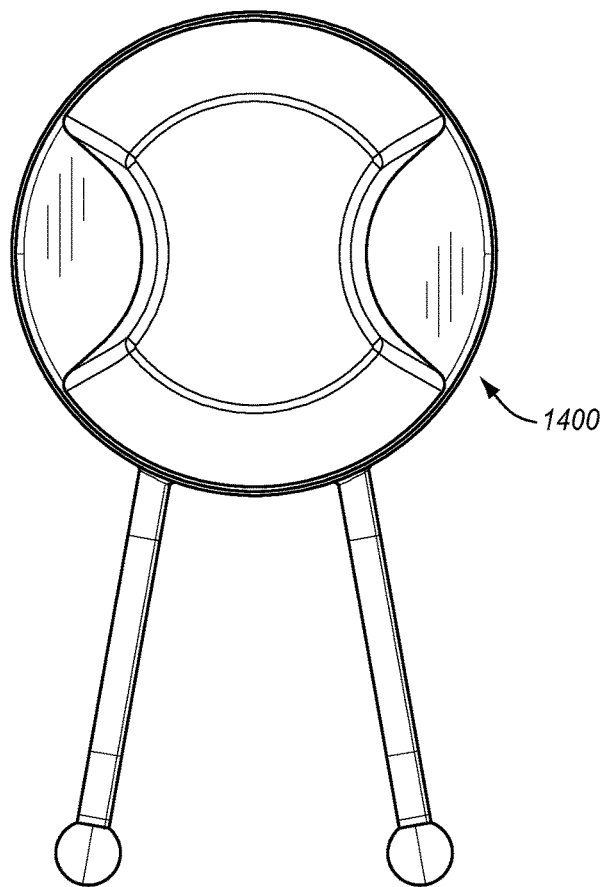
Figure 26:
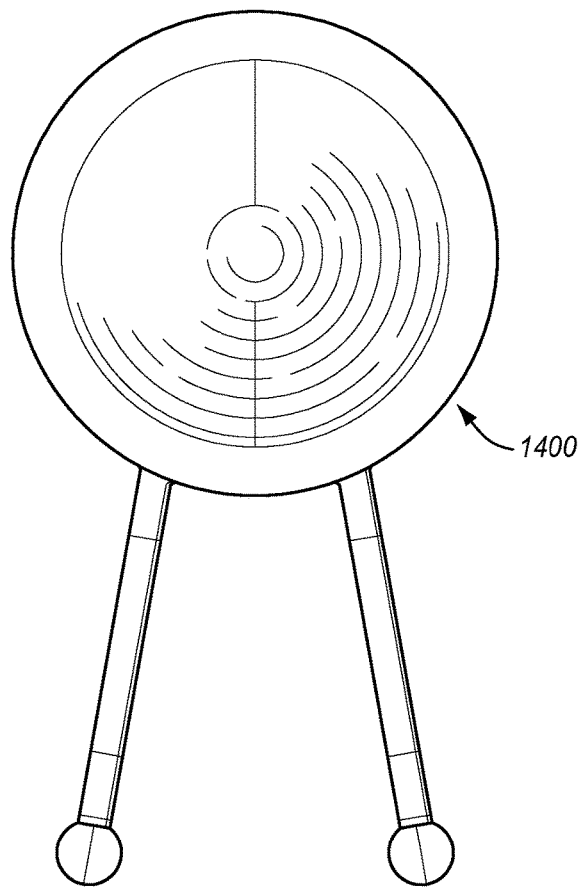
Figure 27:
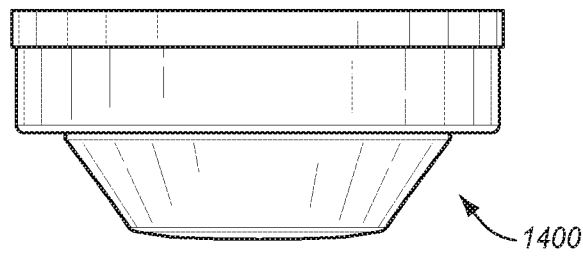
Figure 28:
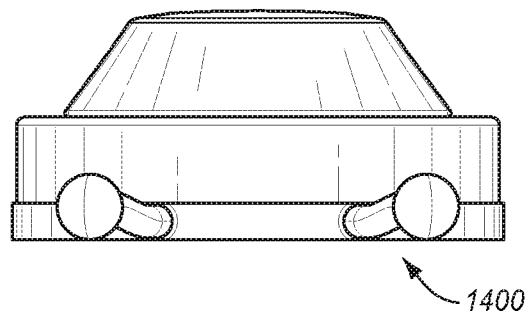
Figure 29:
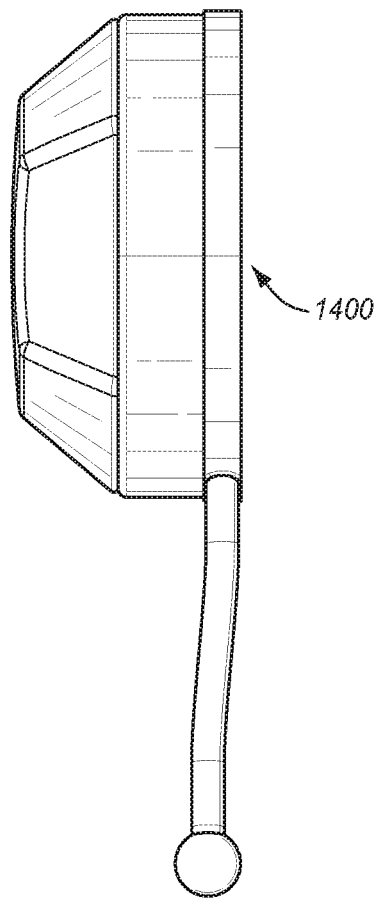
Figure 30:
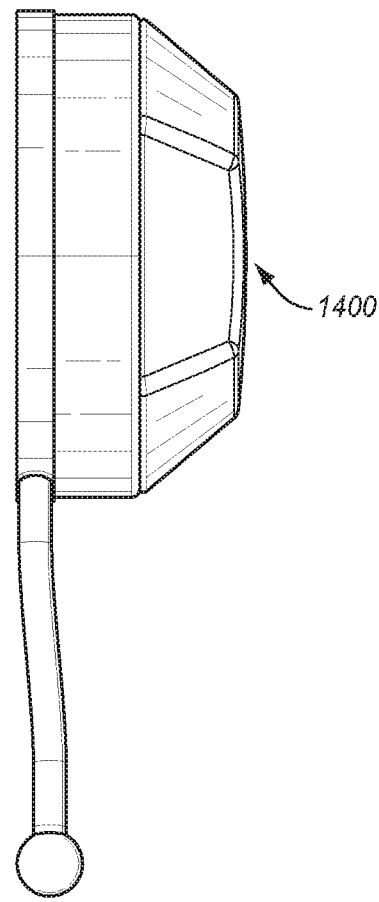
Figure 31:
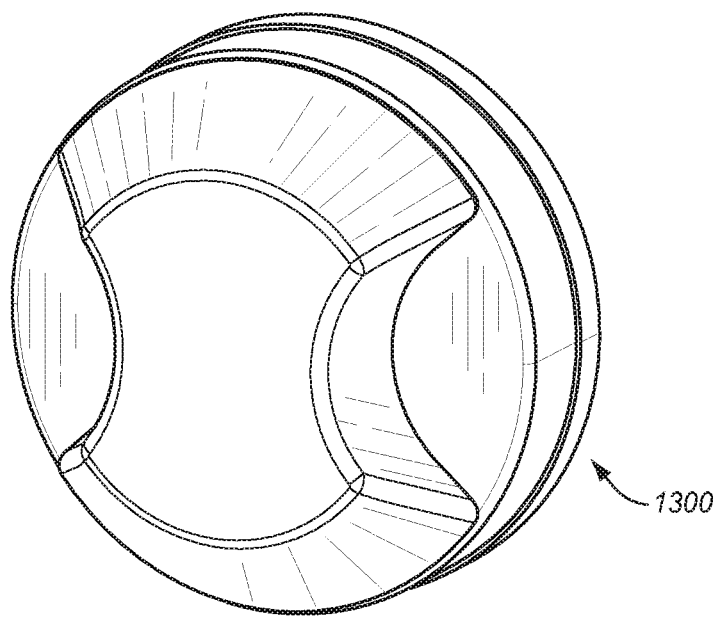
FIGS. 31-38 show additional assembled views of the suction cup holder of FIG. 13.
Figure 32:
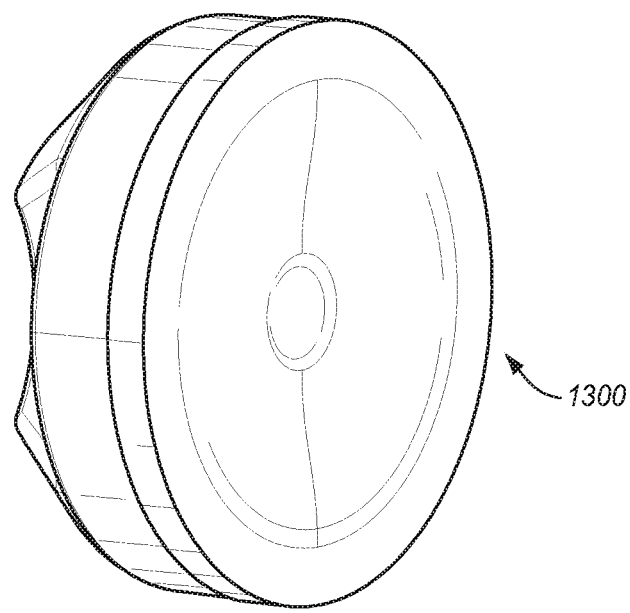
Figure 33:
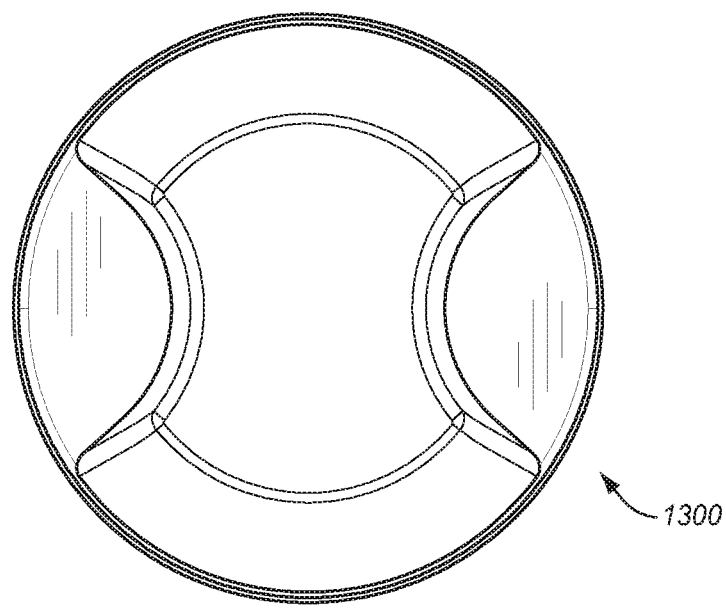
Figure 34:
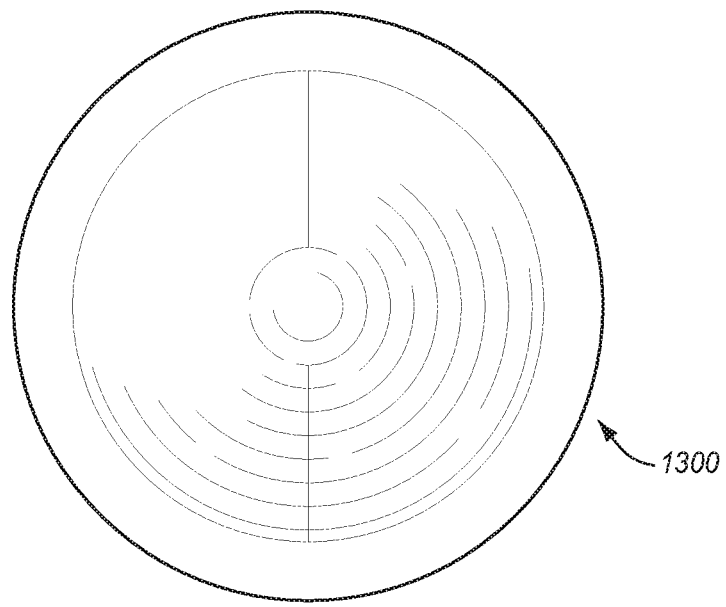
Figure 35:
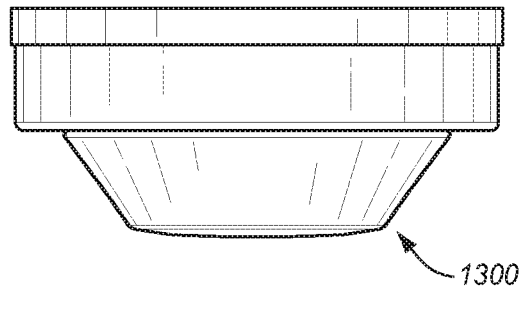
Figure 36:
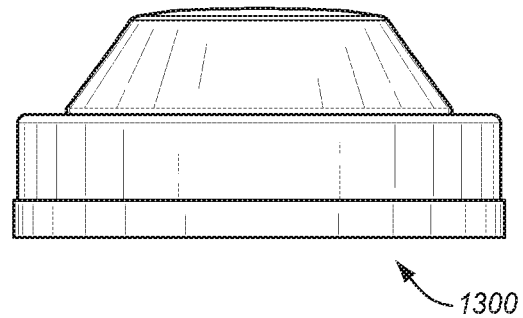
Figure 37:
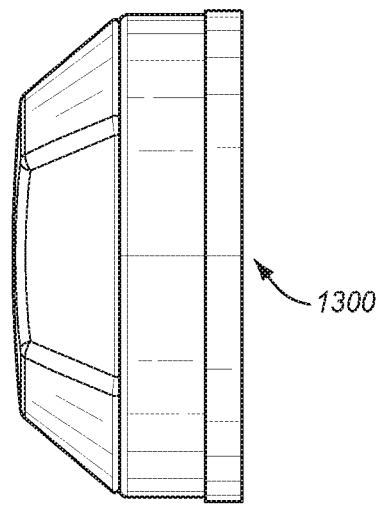
Figure 38:
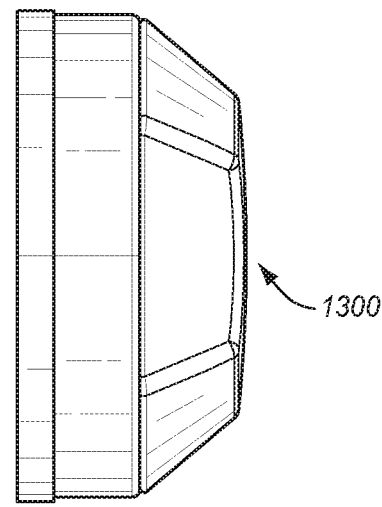

Any alternative embodiment of suction cup holder 1400 is show in FIG. 14. In this embodiment, suction cup 1401 is somewhat different, in that it includes two hangers 1410 having knobbed ends 1420 that fit into apertures in the lighting device in order to hang the device. In this way, various embodiments of the lighting device may be hung without utilizing the magnetic mounting system.

FIGS. 15-22 show an alternative embodiment of a mirror mounted light 1500. Mirror mounted light 1500 is similar in many ways to mirror mounted light 100. One difference is suction mount 1510 is a simpler suction cup and hanger system. Another difference is that bridge 1520 is more narrow and spaces the circular body 1530.

FIGS. 23-30 show additional assembled views suction cup holder 1400. FIGS. 31-38 show additional assembled views of suction cup holder 1300.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

Referring back to FIG. 1, but also applying to FIG. 9 and many other embodiments, generally, touch sensor 120 is utilized for activating the device. Touch sensor 120 is generally a capacitive sensor. In alternative embodiments, different controls may be used, including assemblies of various buttons or control through smartphone 310. In one embodiment, touch sensor 120 is configured to activate the mirror mounted light 100. The touch sensor 120 is run by a microprocessor located in the device that controls the level of LEDs. In many configurations, the LEDs of the device will provide light having a color rated index of 95. The profiles true to life lighting and is generally considered to be good lighting for pictures or videos. In many embodiments, multiple touches on the touch sensor will cycle through different light levels. These light levels may be configured to represent outdoor daylight, indoor brightly lit, indoor dimly lit, and many other possibilities. Many activation and deactivation patterns are possible for the capacitance sensor.

In many configurations, the mirror mounted light includes a battery and circuitry connecting the LEDs, capacitance sensor 120, and the battery, as well as the charging system for the battery. Various arrangements are possible for the circuitry.

Referring back to FIG. 1, but also applying to FIG. 9 and many other embodiments, in alternatives, there are different possibilities for bridge 130. The point of bridge 130 is to have a device in configuration where it may be surrounded by the light provided by the mirror mounted light. In such a configuration, the user may first look in the mirror on which the mirror mounted light 100 is mounted on. The user may perfect their makeup or appearance in the light that the picture will be eventually be taken. The user may then adjust the camera of the smart phone in order to take a picture of the user. Typically, this is done via a timer. The mirror mounted light provides high CRI light and may be set to various color temperatures. Therefore, the user may look at their pose in the mirror as well as their appearance to achieve the desired picture with a minimal number of takes therefore minimize the time needed to produce high quality images.

Additionally, the bridge provided may come in different forms. In some scenarios, no bridge may actually attach to the frame of the ring-shaped light. Instead, a suction cup or adhesive holder may be positioned in the middle of the ring-shaped light and function as a bridge. Additionally, in some scenarios, a cord, chain, rope and other associated hanging device may hang from the top of the ring-shaped light. The smartphone may thusly hang and be connected to such bridge.

In alternative uses, the user may set the mirror mounted light to simulate the lighting anticipated at an event or location the user expects to go. In such a scenario, the user may select a dinner like lighting level or a day time like lighting level, or whatever lighting level the user may select. Then the user can determine how the makeup is will appear in the expected environment.

In some embodiments, a more stripped down ring-shaped light is provided. In this configuration, the ring-shaped light may include a regular switch instead of a capacitance sensor. Additionally, the ring-shaped light may provide only one temperature color range, in many scenarios daylight. Additionally, the ring-shaped light may only provide a brightness setting of daylight. Additionally, no batter power will be included. Since only one color temperature and brightness is provided, not sensor is needed.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A ring-shaped light, comprising:
   a ring-shaped frame, the ring-shaped frame having a void portion in the middle of the ring-shaped frame, such that when the ring-shaped frame is located on a mirror, a face of a user looking into the mirror through the void is viewable to the user;
   a plurality of light sources mounted within the ring-shaped frame in a circular fashion;
   a first sensor for sensing ambient light and controlling the plurality of light sources according to the ambient light to match the color temperature and brightness of the ambient light;
   a bridge, the bridge located in a bottom section of the void, the bridge including a slot for receiving a smartphone;
   a second sensor for activating the plurality of light sources; and
   a mounting system integrated with the frame, the mounting system including a plurality of mirrored discs, mountable via adhesive to a front of the mirror, and a plurality of recesses each interfacing with the plurality of mirrored discs, the plurality of mirrored discs being made of magnetic material and each of the plurality of recesses including a magnet to hold the plurality of discs, the plurality recesses sized and shaped in a complementary fashion to the plurality of discs, the ring-shaped frame removable via the mounting system.

2. The lighting device of claim 1, wherein the plurality of light sources are LEDs and the LEDs provide a Color Rendering Index (CRI) of greater than 90.

3. The lighting device of claim 1, further comprising a microprocessor for controlling the plurality light sources to produce light in a plurality of intensities and colors, wherein one of the plurality of intensities has a color temperature similar to daylight.

4. The lighting device of claim 3, wherein the color temperature is from 2700K to 5600K.

5. A lighting device comprising:
a frame, having an interior cutout area;
a plurality of light sources mounted in the frame;
a sensor for detecting ambient light and controlling the plurality of light sources to produce light having a color temperature and brightness matching the ambient light;
a mounting system, for mounting the frame on a mirror, integrated into the frame, the mounting system providing for ready removal and reattachment of the frame to the mirror; and
a bridge, the bridge connected to the frame, located in the interior cutout area, the bridge including a holding location for a mobile device, the bridge located in front of the mirror when the frame is mounted on the mirror.

6. The lighting device of claim 5, wherein the plurality of light sources are mounted in a circular fashion within the cutout area.

7. The lighting device of claim 6, wherein the sensor for detecting ambient light controls the plurality of light sources to provide a matching color temperature and brightness.

8. The lighting device of claim 7, wherein the plurality of light sources are LEDs and the LEDs provide a Color Rendering Index (CRI) of greater than 90.

9. The lighting device of claim 8, wherein the mounting system includes a plurality of discs, the plurality of discs including adhesive for mounting on a surface, the frame including a plurality of slots sized to mate with the plurality of discs, the plurality of discs each including magnetic material, the plurality of slots each including a magnet for attracting one of the plurality of discs and there by cooperate to hold the lighting device.

10. The lighting device of claim 9, further comprising: a switch mounted on the frame for controlling the plurality of light sources.

11. The lighting device of claim of claim 10, wherein the switch is a capacitance switch.

12. The lighting device of claim 11, further comprising a microprocessor for controlling the plurality light sources to produce light in a plurality of intensities, wherein one of the plurality of intensities has a color temperature similar to daylight.

13. The lighting device of claim 12, wherein the color temperature similar from 2700K to 5600K.

14. The lighting device of claim 13, wherein the bridge spans a lower portion of the cutout area and includes a slot for receiving the mobile device.

15. The lighting device of claim 14, wherein the mobile device is a smartphone.

16. The lighting device of claim 15, wherein the slot is padded.

17. The lighting device of claim 16, wherein the bridge is positioned such that the smartphone is located in an optimal position to take a picture of a user.

18. The lighting device of claim 17, wherein the microprocessor includes a communication system for communicating with a smartphone, allowing the smartphone to control the plurality of light sources.

19. The lighting device of claim 18, further comprising a suction cup connected to the frame via a loop for mounting the lighting device.

20. A method of using a ring-shaped light, the method comprising:
providing a ring-shaped light, including:
a ring-shaped frame, the ring-shaped frame having a void portion in the middle of the ring-shaped frame, such that when the ring-shaped frame is located on a mirror, a face of a user looking into the mirror through the void is viewable to the user;
a plurality of light sources mounted within the ring-shaped frame in a circular fashion;
a bridge, the bridge located in a bottom section of the void, the bridge including a slot for receiving a smartphone;
a sensor for controlling the plurality of light sources;
a mounting system integrated with the frame, the mounting system including a plurality of discs, mountable via adhesive to the mirror, and a plurality of recesses each interfacing with the plurality of discs, the plurality of discs being made of magnetic material and each of the plurality of recesses including a magnet to hold the plurality of discs, the plurality recesses sized and shaped in a complementary fashion to the plurality of discs;
mounting the ring-shaped light on the mirror using the mounting system;
controlling the ring-shaped light with the sensor;
providing light that matches an intensity and color temperature of the ambient light.

* * * * *